US012600393B1

(12) United States Patent (10) Patent No.: US 12,600,393 B1
Yuan et al. (45) Date of Patent: Apr. 14, 2026

(54) FOLD-IN-HALF WAGON

(71) Applicant: Kaijing Yuan, Jinhua (CN)

(72) Inventors: Kaijing Yuan, Jinhua (CN); Bangjie Yuan, Jinhua (CN); Yiheng Yuan, Jinhua (CN); Wenkai Yang, Jinhua (CN)

(73) Assignee: Kaijing Yuan, Jinhua (CN)

( * ) Notice: Subject to any disclaimer, the term of this patent is extended or adjusted under 35 U.S.C. 154(b) by 0 days.

(21) Appl. No.: 19/403,331

(22) Filed: Nov. 28, 2025

(30) Foreign Application Priority Data

Nov. 28, 2024 (CN) .......................... 202411729520.6

(51) Int. Cl.
B62B 3/02 (2006.01)
B62B 3/10 (2006.01)

(52) U.S. Cl.
CPC .............. B62B 3/02 (2013.01); B62B 3/106 (2013.01); *B62B 2203/00* (2013.01); *B62B 2205/104* (2013.01)

(58) Field of Classification Search
CPC ....... B62B 3/02; B62B 3/106; B62B 2203/00; B62B 2205/104
See application file for complete search history.

(56) References Cited

U.S. PATENT DOCUMENTS 6,733,026 B1 * 5/2004 Robberson .............. B62B 3/007
280/30
6,845,991 B1 * 1/2005 Ritucci ................... B62B 3/007
280/30

7,819,409 B2 * 10/2010 Chang ................... B62B 5/0083
280/654
8,091,916 B2 * 1/2012 Shapiro ................... B62B 3/007
280/87.05
11,285,983 B1 * 3/2022 Horowitz ................. B62B 3/02
11,388,999 B1 * 7/2022 Horowitz ............... B62B 3/022
12,344,299 B1 * 7/2025 Wu ......................... B62B 3/007
12,351,225 B2 * 7/2025 Lei ........................... B62B 7/08
12,371,084 B2 * 7/2025 Qiao ....................... B62B 5/067
12,509,134 B1 * 12/2025 Huang ................... B62B 3/007
2019/0185038 A1 * 6/2019 Choi ....................... B60B 33/02
2023/0001973 A1 * 1/2023 Frankel ................... B62B 3/003
2023/0219608 A1 * 7/2023 Jiang ....................... B62B 3/025
280/651

FOREIGN PATENT DOCUMENTS

CN       116080730 A       5/2023
CN       220884416 U       5/2024

* cited by examiner

*Primary Examiner* — Brian L Swenson

(57) ABSTRACT

Provided is a fold-in-half wagon, including a bottom frame (6), a front frame (2), a rear frame (3), a left side frame (4), and a right side frame (5). To fold the fold-in-half wagon, a middle portion of the bottom frame (6) is pulled upward, so that a front section (11) and a rear section (12) are folded relative to each other, a left fitting structure (21) moves upward from a lower end along a left guide structure (20), a right fitting structure (24) moves upward from a lower end along a right guide structure (23), and the front frame (2) and the rear frame (3) move toward each other and drive parallelograms of the left side frame (4) and the right side frame (5) to lift middle supporting bases.

15 Claims, 19 Drawing Sheets

FOLD-IN-HALF WAGON

CROSS-REFERENCE TO RELATED APPLICATIONS

The present disclosure claims priority of Chinese Patent Application No. 202411729520.6, filed on Nov. 28, 2024, the entire contents of which are hereby incorporated by reference.

TECHNICAL FIELD

The present disclosure relates to the technical field of folding wagons, and specifically to a fold-in-half wagon.

BACKGROUND

With the rise of outdoor leisure activities, the demand for outdoor products is also increasing. One of the outdoor products is a folding wagon, which is essentially a wagon that can be folded up and stored. The folding wagon is mainly used for carrying goods, and can be folded to a small size to facilitate storage. When unfolded, the folding wagon typically takes the shape of a cuboid. The folding wagon includes a front frame, a rear frame, a left side frame, a right side frame, and a bottom frame. The front frame, the rear frame, the left side frame, and the side frame define four side surfaces in a circumferential direction of the folding wagon. The four side surfaces and a bottom surface where the bottom frame lies define a cuboid accommodating space. After wheels are installed on the folding wagon, folding wagon can be moved via the wheels.

It can be seen from the above that the structure of the folding wagon needs to be designed to be collapsible, and considerations must be made for the design requirements of the front frame, the rear frame, the left side frame, the right side frame, and bottom frame during folding. The structure involves a certain level of complexity. Therefore, how to design the folding mechanism and control the volume after folding has become a challenge. Although numerous folding design schemes have been provided in the prior art, it is more challenging to design a folding wagon that has a small volume when folded and a large capacity when unfolded.

SUMMARY

The technical problem to be solved by the present disclosure is to overcome the defects of the prior art and provide a fold-in-half wagon that has a small volume when folded and a large capacity when unfolded.

To solve the above technical problem, the present disclosure provides a fold-in-half wagon, which includes wheels and a foldable wagon frame, where the wheels are detachably or non-detachably connected to the wagon frame, and the wagon frame includes a bottom frame, a front frame arranged on a front side of the bottom frame, a rear frame arranged on a rear side of the bottom frame, and a left side frame and a right side frame respectively arranged on two lateral sides of the bottom frame, where the front frame and the rear frame are rectangular, and a left side rod and a right side rod of the front frame and a left side rod and a right side rod of the rear frame respectively serve as four corner columns at four corners of the wagon frame;

the bottom frame includes a front section, a rear section, and a left connection base and a right connection base symmetrically arranged in a left-right direction, an outer cross beam and an inner cross beam are arranged between a left side rod and a right side rod of the front section in a transverse direction, another outer cross beam and another inner cross beam are arranged between a left side rod and a right side rod of the rear section in the transverse direction, a front end of the left side rod of the front section is hinged to a lower fixed base of the front frame which is fixedly arranged at a lower end of the left side rod of the front frame, a rear end of the left side rod of the front section is hinged to a front end of the left connection base, a rear end of the left connection base is hinged to a front end of the left side rod of the rear section, a rear end of the left side rod of the rear section is hinged to a lower fixed base of the rear frame which is fixedly arrange at a lower end of the left side rod of the rear frame, a front end of the right side rod of the front section is hinged to the lower fixed base of the front frame which is fixedly arranged at a lower end of the right side rod of the front frame, a rear end of the right side rod of the front section is hinged to a front end of the right connection base, a rear end of the right connection base is hinged to a front end of the right side rod of the rear section, and a rear end of the right side rod of the rear section is hinged to the lower fixed base of the rear frame which is fixedly arrange at a lower end of the right side rod of the rear frame, to enable the bottom frame to be foldable in half; when a force is applied to a middle portion of the bottom frame to lift upward and fold the bottom frame, the front section, the rear section, and the connection bases form a U-shaped accommodating space having an opening facing downward, the front frame and the rear frame synchronously move inward toward each other; and after folded, the front frame, the front section, the rear section and the rear frame are in a gathered state and are distributed in sequence from front to rear;

the left side frame is arranged on a left outer side of the bottom frame, the right side frame is arranged on a right outer side of the bottom frame, the left side frame and the right side frame each include two parallelograms, and on each side, two neighboring inner ends of the two parallelograms are hinged by a middle supporting base, and outer ends of the two parallelograms are respectively hinged to the front frame and the rear frame by the lower fixed bases, where the middle supporting base at the left side frame is a left middle supporting base, the middle supporting base at the right side frame is a right middle supporting base, a left suspension component is arranged between the left middle supporting base and a middle portion of the left connection base, an upper end of the left suspension component is fixed to the left middle supporting base, the left suspension component is provided with a left guide structure along a longitudinal direction thereof, a left fitting structure configured to engage with the left guide structure is arranged at the middle portion of the left connection base, the left guide structure is further configured to limit a lower limit position of the left fitting structure to form a first position limitation, a right suspension component is arranged between the right middle supporting base and a middle portion of the right connection base, an upper end of the right suspension component is fixed to the right middle supporting base, the right suspension component is provided with a right guide structure along a longitudinal direction thereof, a right fitting structure configured to engage with the right guide structure is arranged at the middle portion of the right connection base, and the right guide structure is further configured to limit a lower limit position of the right fitting structure to form a second position limitation;

when the left side frame and the right side frame are in an unfolded state, the two parallelograms on each side are distributed in substantially an inverted V-shape, the left fitting structure moves to the lower limit position on the left guide structure to form the first position limitation, and the right fitting structure moves to the lower limit position on the right guide structure to form the second position limitation, so that the front section, the connection bases, and the rear section form a flat bottom frame, the left suspension component and the right suspension component suspend the bottom frame by the left connection base and the right connection base, to finally achieve an unfolded state of the fold-in-half wagon; and to fold the wagon frame for storage, the middle portion of the bottom frame is pulled upward, so that the front section and the rear section are folded relative to each other, the left fitting structure moves upward from a lower end along the left guide structure, the right fitting structure moves upward from a lower end along the right guide structure, and the front section and the rear section drive the front frame and the rear frame to move toward each other and drive the parallelograms of the left side frame and the right side frame to lift the middle supporting bases, so that the front frame, the rear frame, the left side frame, the right side frame, the front section, and the rear section move toward each other, to finally achieve a folded state of the fold-in-half wagon.

As an improvement, the left suspension component is sheet-shaped or rod-shaped, the left suspension component is provided with a left guide groove or a left guide rod along a longitudinal direction thereof, a left guide column or a left guide sleeve is arranged at the middle portion of the left connection base, the left guide column or the left guide sleeve is slidably engaged with the left guide groove or the left guide rod, the right suspension component is sheet-shaped or rod-shaped, the right suspension component is provided with a right guide groove or a right guide rod along a longitudinal direction thereof, a right guide column or a right guide sleeve is arranged at the middle portion of the right connection base, and the right guide column or the right guide sleeve is slidably engaged with the right guide groove or the right guide rod.

As an improvement, the wheels are respectively detachably connected to lower portions of the front frame and the rear frame and/or lower ends of the four corner columns, and when the fold-in-half wagon is to be stored, the wheels are detached and received in the U-shaped accommodating space.

As an improvement, a connection column is provided on a lower cross beam of the front frame, wheels are detachably connected to the connection column, and a lower end of each of the front side rod and the right side rod of the front frame is detachably connected to one of the wheels; or a connection column is provided on a lower cross beam of the rear frame, wheels are detachably connected to the connection column, and a lower end of each of the front side rod and the right side rod of the rear frame is detachably connected to one of the wheels; or each of a lower cross beam of the front frame and a lower cross beam of the rear frame is provided with a connection column, and the wheels are detachably connected to the connection columns; or a lower end of each of the four corner columns is detachably connected to one of the wheels.

As an improvement, a connection column is fixedly arranged below, above, or in front of a lower cross beam, or is fixedly arranged crossing the lower cross beam, and a lower end of the connection column is arranged to be flush with lower ends of the two corner columns.

As an improvement, the connection column and the four corner columns are each configured as an outer sleeve having a tubular body with a circular, polygonal, D-shaped, elliptical, or flat oval cross section.

As an improvement, the left middle supporting base and the right middle supporting base are each provided with a transmission structure, the transmission structure is respectively connected to any pair of neighboring ends of the corresponding two parallelograms, and when one of the parallelograms moves, the other parallelogram is synchronously driven to move by the transmission structure, where when one of the parallelograms moves outward, the other parallelogram moves outward, so that the two parallelograms move away from each other to achieve the unfolded state; and when one of the parallelograms moves inward, the other parallelogram moves inward, so that the two parallelograms move toward each other to achieve the folded state.

As an improvement, the left connection base and the right connection base are each in a form of a channel-section member with an inverted U-shaped cross section and an opening facing downward, a limiting portion is arranged at each of two ends of the channel-section member, and when the bottom frame is unfolded, the limiting portions form a downward position limitation to upper side surfaces of the left side rod and the right side rod of the front section and the left side rod and the right side rod of the rear section; or the left connection base and the right connection base are each in a form of a channel-section member with an inverted U-shaped cross section and an opening facing downward, a connection member is hinged to each of two ends of the channel-section member, the connection members are fixedly connected to corresponding side rods in one-to-one correspondence, each of the connection members is provided with a limiting end above a hinge axis, and when the bottom frame is in the unfolded state, two ends of the connection bases limit the left side rod and the right side rod of the front section and the left side rod and the right side rod of the rear section in a horizontal direction by the limiting ends of the connection members.

As an improvement, a connecting rod is arranged between the middle portion of the left connection base and the middle portion of the right connection base, the left connection base and the right connection base are transversely connected together by the connecting rod, and when the connecting rod is pulled upward, the connecting rod drives the left connection base and the right connection base to move upward, so that the front section and the rear section are folded relative to each other.

As an improvement, the inner cross beam on an inner side of the front section and the inner cross beam on an inner side of the rear section are bundled together by a Velcro tie on a bottom surface of a bag of the fold-in-half wagon, or a connecting rod is fixedly arranged between the left connection base and the right connection base in the transverse direction, and a Velcro tie is connected to the connecting rod; and a pull strap is arranged at a middle portion of an inner bottom surface of the bag, and when the pull strap is pulled upward, the bag drives the left connection base and the right connection base to move upward, so that the front section and the rear section are folded relative to each other.

As an improvement, the fold-in-half wagon further includes a handle for a user to move the fold-in-half wagon, and when the front frame, the front section, the rear section, and the rear section are in the gathered state and are distributed in sequence from front to rear, an accommodating recess with the front frame as an opening and the front section as a bottom is formed between the front frame and the front section, and/or an accommodating recess with the rear frame as an opening and the rear section as a bottom is formed between the rear frame and the rear section, where the accommodating recess is configured to accommodate and store the handle.

As an improvement, the wheels are respectively non-detachably connected to lower portions of the front frame and the rear frame and/or lower ends of the four corner columns, the wheels are gathered together in a front-rear direction during folding of the fold-in-half wagon, and the wheels are moved away from each other in the front-rear direction during unfolding of the fold-in-half wagon.

As an improvement, four wheels are provided, including two universal wheels on the front side and two directional wheels on the rear side, or two universal wheels on the rear side and two directional wheels on the front side, or two universal wheels on the front side and two universal wheels on the rear side.

By the above configurations, the present disclosure has the following advantages over the prior art. When a force is applied to the middle portion of the bottom frame to lift upward and fold the bottom frame, the front section, the rear section, and the connection bases form a U-shaped accommodating space having an opening facing downward. The front frame and the rear frame synchronously move inward toward each other, and after folded, the front frame, the front section, the rear section and the rear frame are in a gathered state and are distributed in sequence from front to rear. In addition, the left side frame is arranged on a left outer side of the bottom frame, the right side frame is arranged on a right outer side of the bottom frame, and the left side frame and the right side frame each include two parallelograms. As such, the fold-in-half wagon has a small volume when folded and has a capacity as large as possible when unfolded.

The U-shaped accommodating space can be used for storing accessories of the fold-in-half wagon, so that the volume of the fold-in-half wagon during transportation is further reduced, thereby reducing the transportation costs.

In particular, the following structures are further provided and organically integrated into the whole design. A rigid left suspension component is arranged between the left middle supporting base and a middle portion of the left connection base. An upper end of the left suspension component is fixed to the left middle supporting base. The left suspension component is provided with a left guide structure along a longitudinal direction thereof. A left fitting structure configured to engage with the left guide structure is arranged at the middle portion of the left connection base. The left guide structure is further configured to limit a lower limit position of the left fitting structure to form a first position limitation. A rigid right suspension component is arranged between the right middle supporting base and a middle portion of the right connection base. An upper end of the right suspension component is fixed to the right middle supporting base. The right suspension component is provided with a right guide structure along a longitudinal direction thereof. A right fitting structure configured to engage with the right guide structure is arranged at the middle portion of the right connection base. The right guide structure is further configured to limit a lower limit position of the right fitting structure to form a second position limitation.

The design of the guiding and fitting structures for the rigid left suspension component, the left fitting structure, the rigid right suspension component, and the right fitting structure has the following advantages. (1) Neighboring ends of the front section and the rear section can synchronously slide in the vertical direction. (2) The phenomenon that the movement of the front section in the front-rear direction and the vertical direction is not in synchronization with the movement of the rear section in the front-rear direction and the vertical direction during folding and unfolding is avoided. (3) The smoothness of folding and unfolding of the wagon frame is improved.

The reason is as follows. The rigid left suspension component is arranged. The upper end of the left suspension component is fixed to the left middle supporting base. The left suspension component is provided with the left guide structure along the longitudinal direction thereof. The left fitting structure configured to engage with the left guide structure is arranged at the middle portion of the left connection base. The rigid right suspension component is arranged. The upper end of the right suspension component is fixed to the right middle supporting base. The right suspension component is provided with the right guide structure along the longitudinal direction thereof. The right fitting structure configured to engage with the right guide structure is arranged at the middle portion of the right connection base. Neighboring ends of the front section and the rear section move in the vertical direction under the guidance of the suspension component. As such, the front section and the rear section are restricted from unduly swinging in the front-rear direction and the vertical direction, thereby ensuring that the front section and the rear section always move smoothly along a center line. Without the arrangement of the left fitting structure at the middle portion of the left connection base to engage with the left guide structure and the arrangement of the right fitting structure at the middle portion of the right connection base to engage with the right guide structure, the movement of the front section in the front-rear direction and the vertical direction will not be in synchronization with the movement of the rear section in the front-rear direction and the vertical direction when the bottom frame is pulled upward to fold the fold-in-half wagon or when the bottom frame slides downward during unfolding of the fold-in-half wagon.

Figure 1:
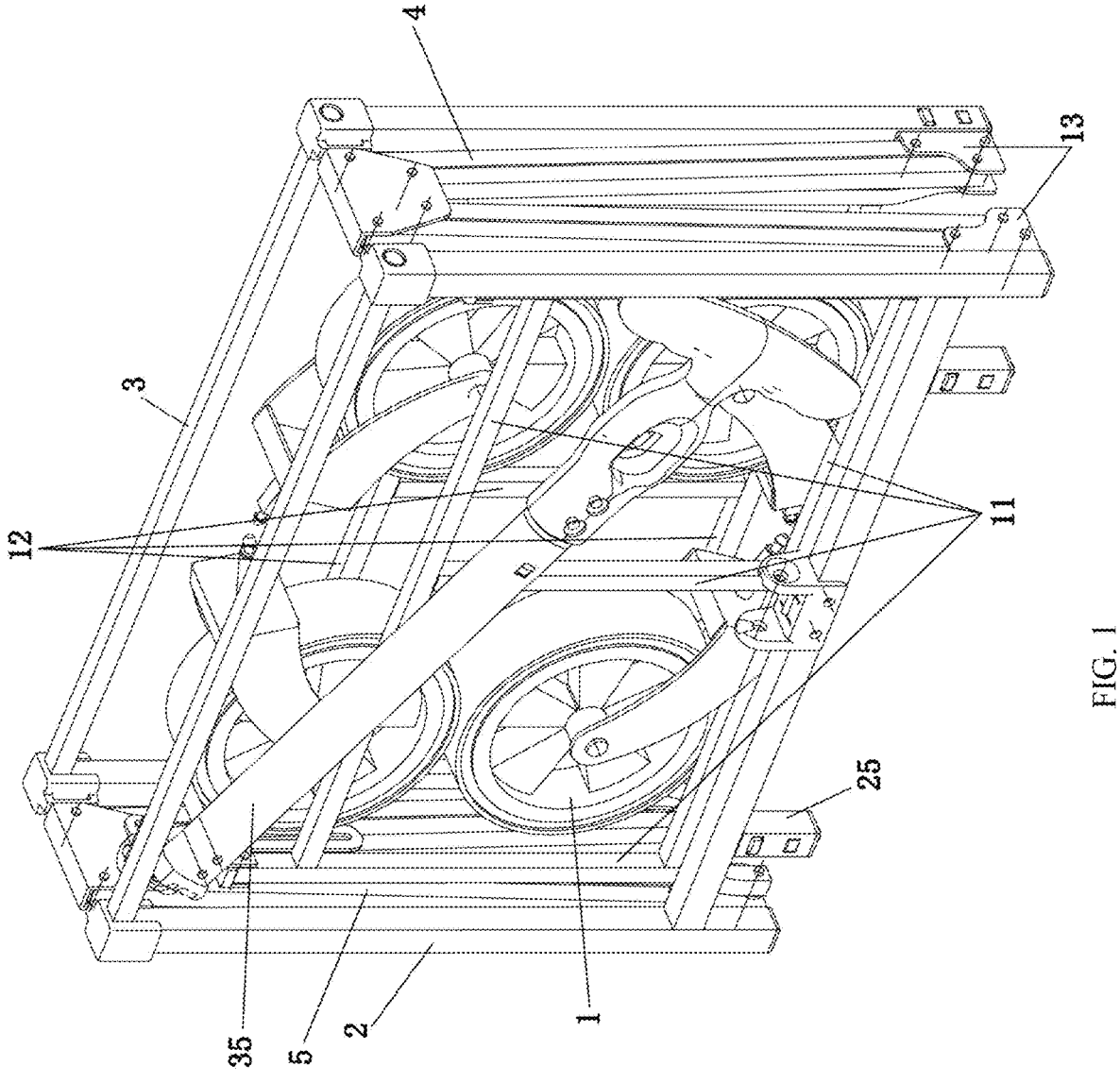
FIG. 1 is a schematic perspective view from a front side of a fold-in-half wagon in a folded state according to the present disclosure.

In the figures, the following reference signs respectively represent: 1. wheel; 2. front frame; 3. rear frame; 4. left side frame; 5. right side frame; 6. bottom frame; 7. left side rod; 8. right side rod; 9. outer cross beam; 10. inner cross beam; 11. front section; 12. rear section; 13. lower fixed base; 14. left connection base; 15. right connection base; 16. U-shaped accommodating space; 17. left middle supporting base; 18. right middle supporting base; 19. left suspension component; 20. left guide structure; 21. left fitting structure; 22. right suspension component; 23. right guide structure; 24. right fitting structure; 25. connection column; 26. lower cross beam; 27. limiting portion; 28. connection member; 29. limiting end; 30. connecting rod; 31. bag; 32. tie; 33. reinforcing rod; 34. pull strap; 35. handle; 36. transmission gear; 37. corner column.

DESCRIPTION OF EMBODIMENTS

The following description serves to disclose the present disclosure to enable those skilled in the art to implement the present disclosure. The embodiments in the following description are given by way of example only, and other modifications will be apparent to those skilled in the art. The basic principles of the present disclosure defined in the following description can be applied to other implementation schemes, modifications, improvements, equivalent schemes, and other technical schemes that do not depart from the spirit and scope of the present disclosure.

It should be understood that in the description of the present disclosure, the orientation or positional relationships indicated by the terms "longitudinal", "transverse", "upper", "lower", "front", "rear", "left", "right", "vertical", "horizontal", "top", "bottom", "inner", "outer", etc. are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure.

It can be understood that the terms such as "a", "an", and "the" should be construed as "at least one" or "one or more", i.e., in one embodiment, the number of elements may be one, and in some other embodiments, the number of elements may be more than one. In other words, the terms such as "a", "an", and "the" are not intended to limit the number of elements.

As shown in FIG. 1 to FIG. 19, an embodiment of the present disclosure discloses a fold-in-half wagon, which includes wheels 1 and a foldable wagon frame. The wheels 1 are detachably or non-detachably connected to the wagon frame. The wagon frame includes a bottom frame 6, a front frame 2 arranged on a front side of the bottom frame 6, a rear frame 3 arranged on a rear side of the bottom frame 6, and a left side frame 4 and a right side frame 5 respectively arranged on two lateral sides of the bottom frame 6.

Figure 2:
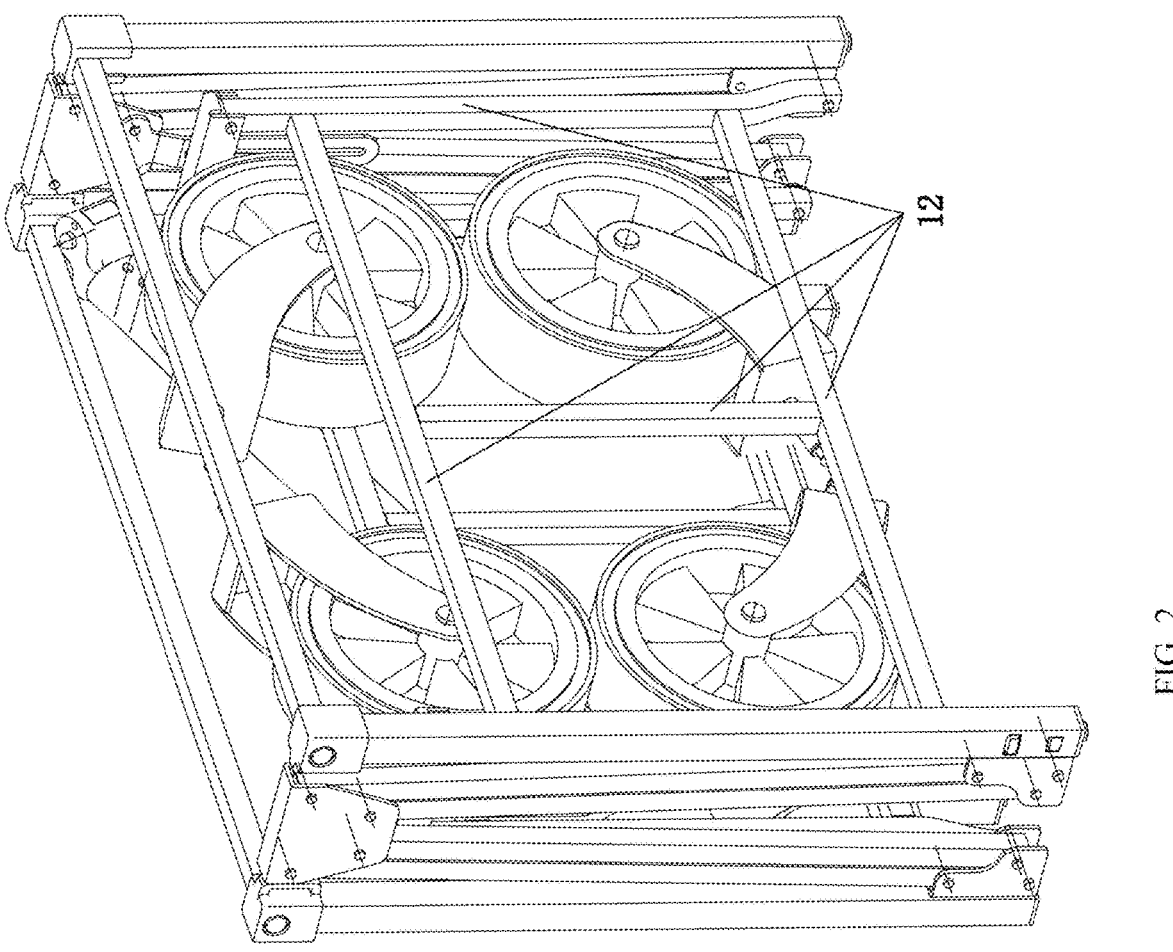
FIG. 2 is a schematic perspective view from a rear side of a fold-in-half wagon in a folded state according to the present disclosure.
Figure 3:
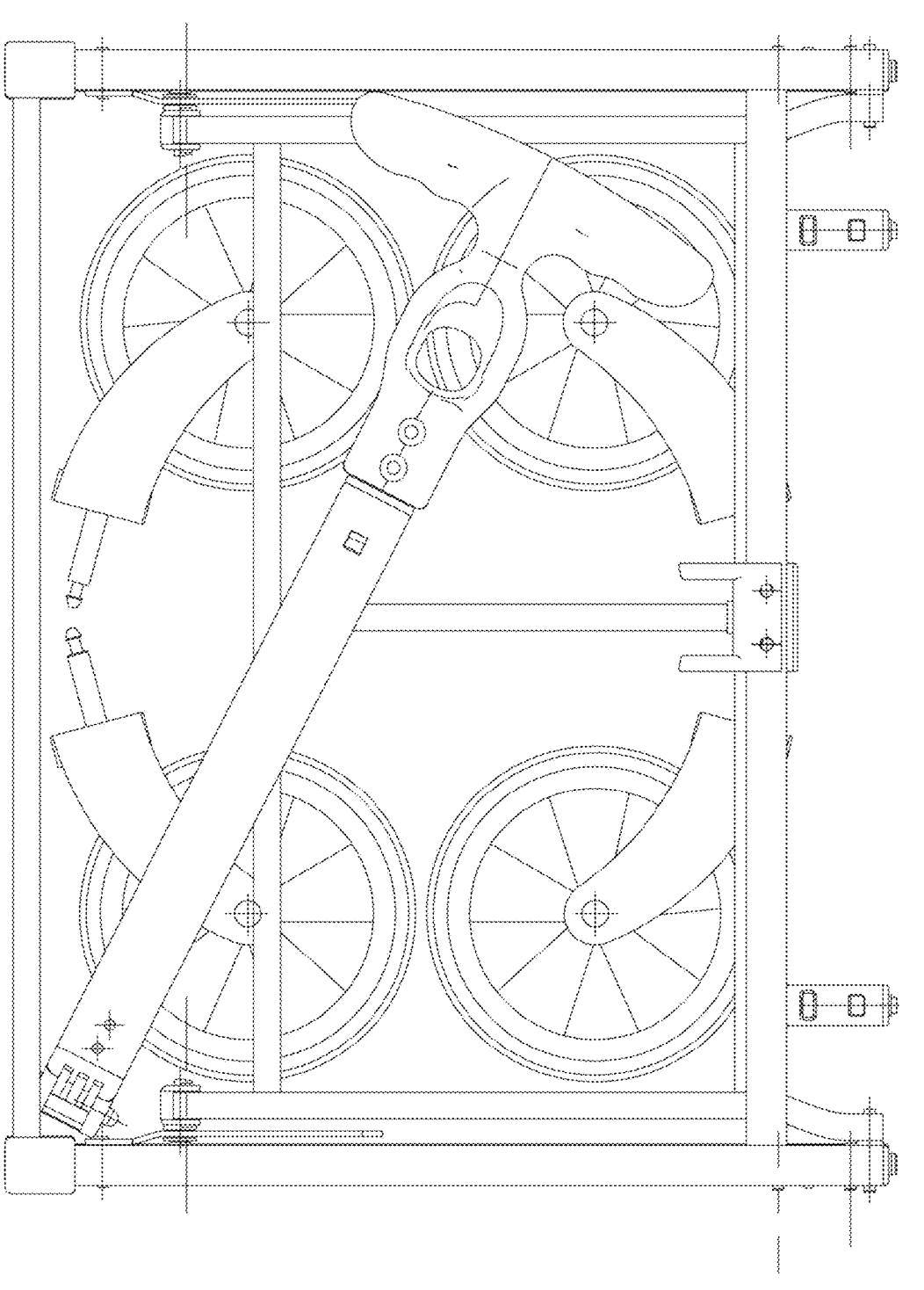
FIG. 3 is a front view of a fold-in-half wagon in a folded state according to the present disclosure.
Figure 4:
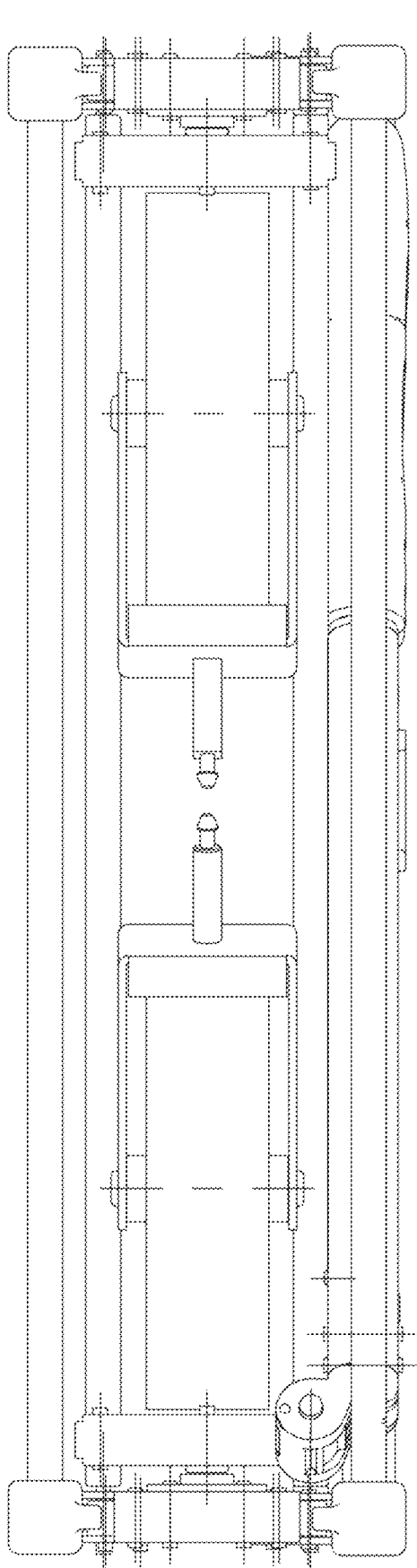
FIG. 4 is a top view of a fold-in-half wagon according to the present disclosure.
Figure 5:
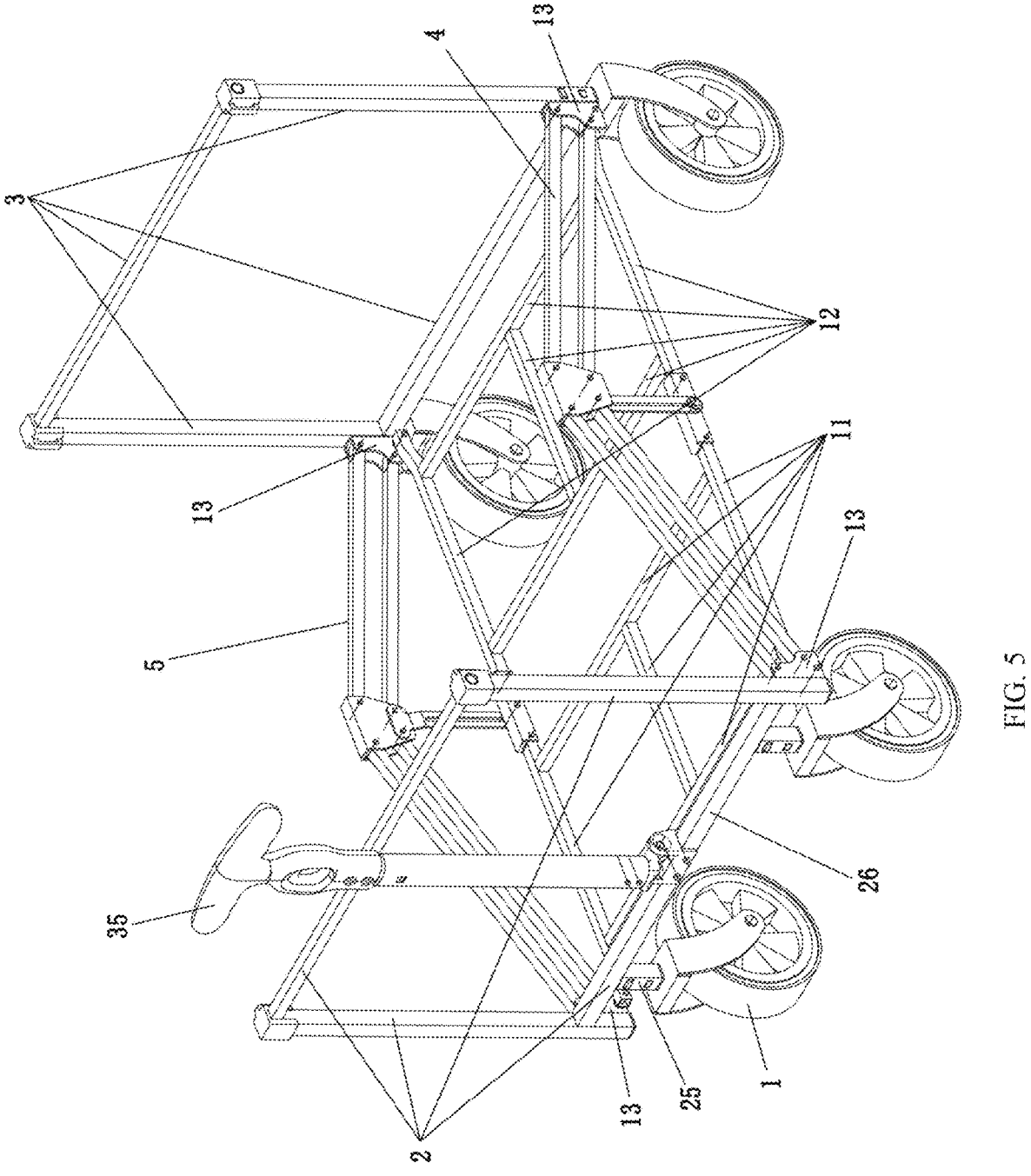
FIG. 5 is a schematic perspective view of a fold-in-half wagon in an unfolded state according to the present disclosure.
Figure 6:
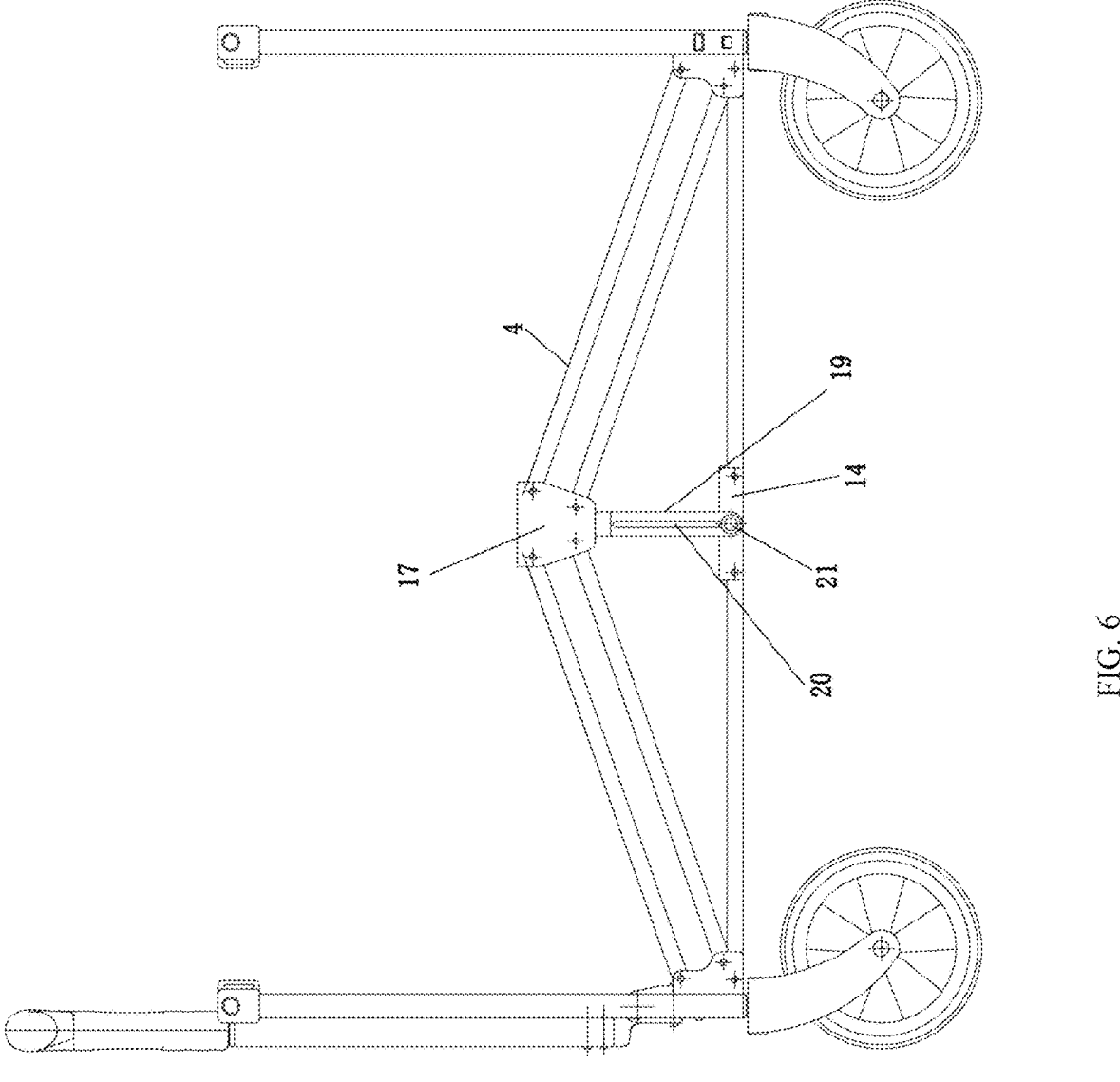
FIG. 6 is a left view of a fold-in-half wagon in an unfolded state according to the present disclosure.
Figure 7:
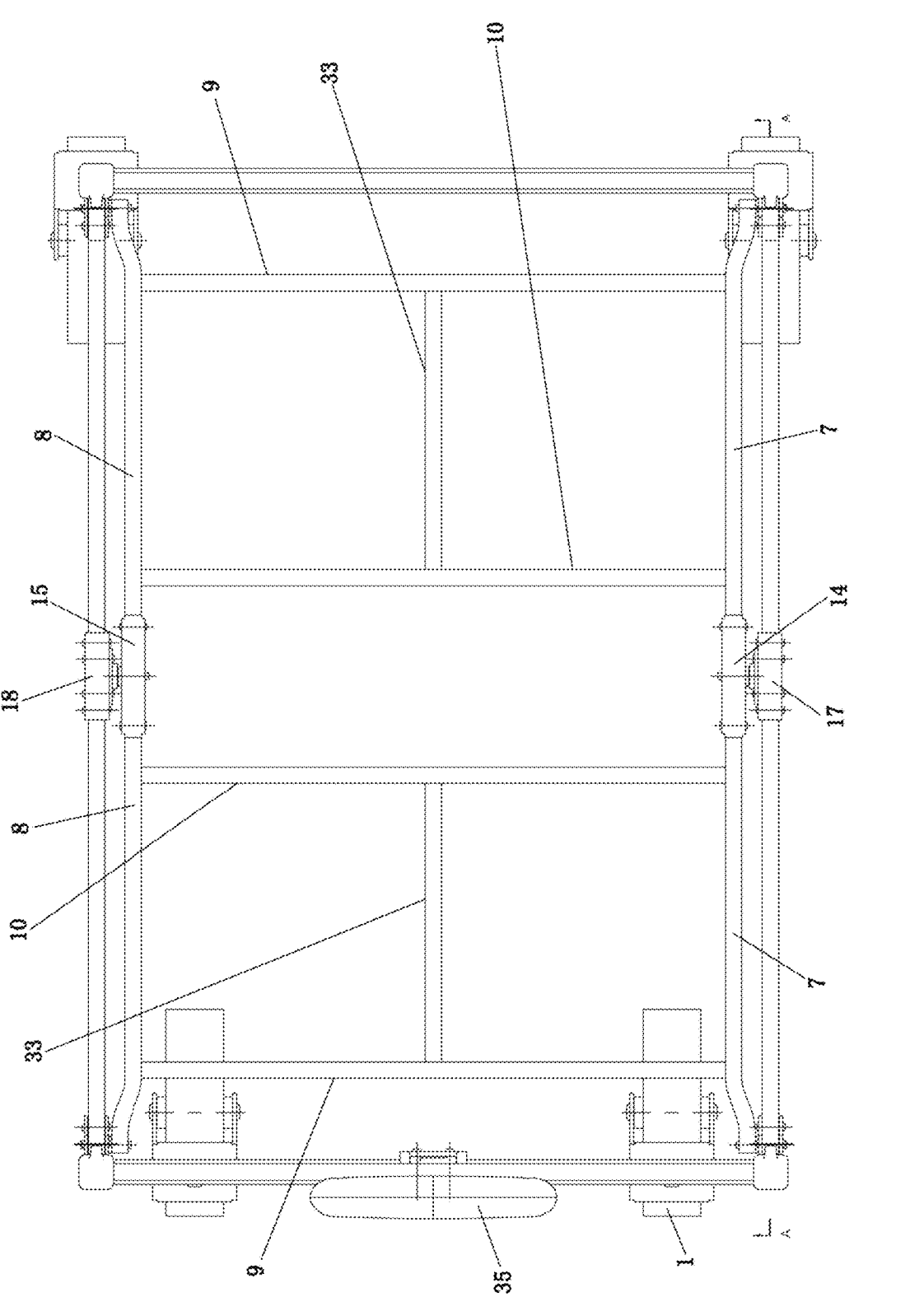
FIG. 7 is a top view of a fold-in-half wagon in an unfolded state according to the present disclosure.

As shown in FIG. 1, FIG. 2, and FIG. 5, the front frame 2 and the rear frame 3 are rectangular, and a left side rod and a right side rod of the front frame 2 and a left side rod and a right side rod of the rear frame 3 respectively serve as four corner columns 37 at four corners of the wagon frame.

Figure 11:
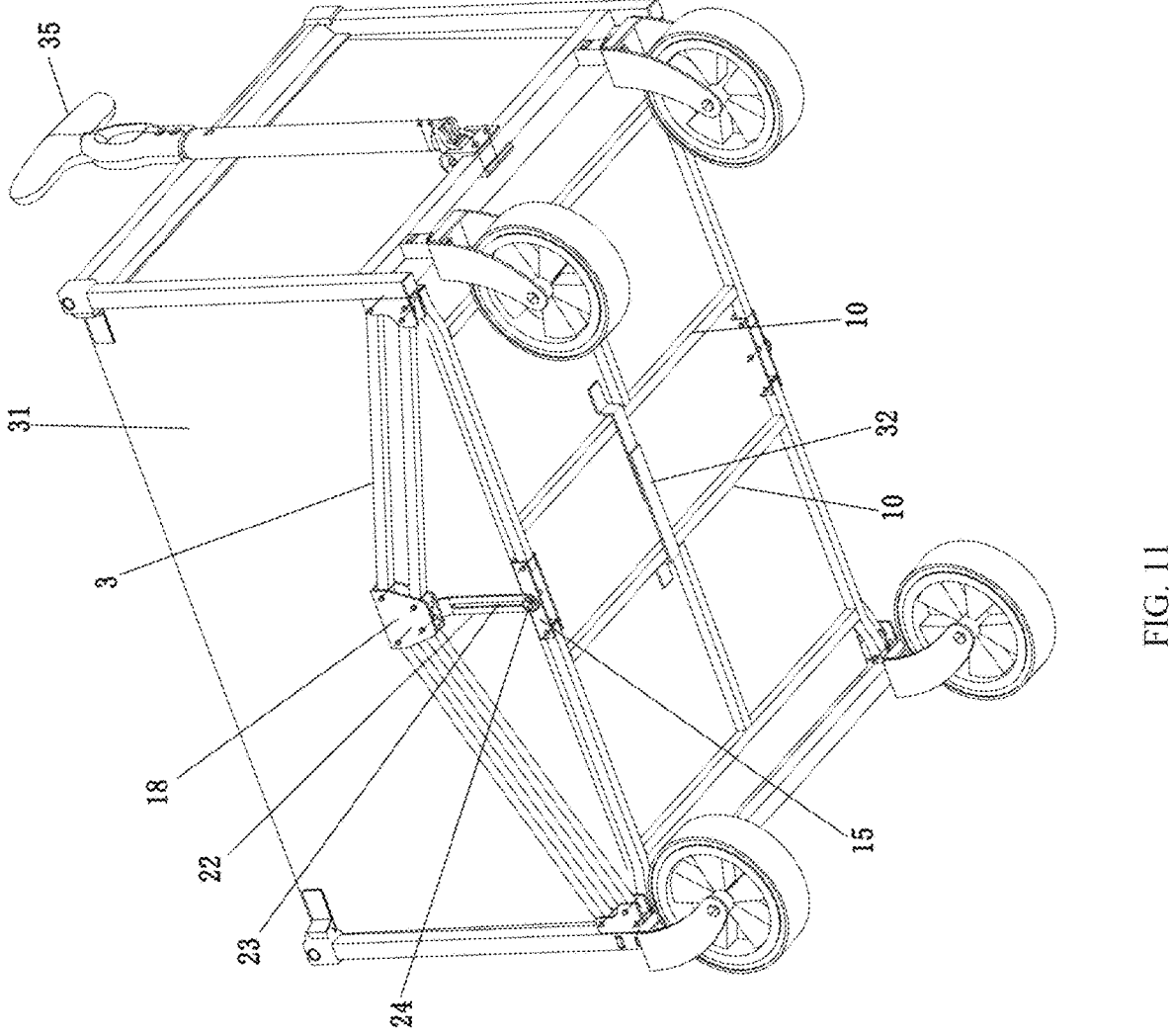
FIG. 11 is a schematic perspective view from a bottom side of a fold-in-half wagon in an unfolded state with a bag mounted thereto according to the present disclosure.

A lower fixed base 13 is arranged at a lower end of each corner column 37. The front frame 2 and the rear frame 3 are respectively connected to the bottom frame 6 by the lower fixed bases 13. Specifically, as shown in FIG. 5 and FIG. 11, the bottom frame 6 includes a front section 11, a rear section 12, and a left connection base 14 and a right connection base 15 symmetrically arranged in a left-right direction. An outer cross beam 9 and an inner cross beam 10 are arranged between a left side rod 7 and a right side rod 8 of the front section 11 in a transverse direction. Another outer cross beam 9 and another inner cross beam 10 are arranged between a left side rod 7 and a right side rod 8 of the rear section 12 in the transverse direction. A front end of the left side rod 7 of the front section 11 is hinged to a lower fixed base 13 of the front frame 2 which is fixedly arranged at a lower end of the left side rod of the front frame 2. A rear end of the left side rod 7 of the front section 11 is hinged to a front end of a left connection base 14. A rear end of the left connection base 14 is hinged to a front end of the left side rod 7 of the rear section 12. A rear end of the left side rod 7 of the rear section 12 is hinged to a lower fixed base 13 of the rear frame 3 which is fixedly arrange at a lower end of the left side rod of the rear frame 3. A front end of the right side rod 8 of the front section 11 is hinged to the lower fixed base 13 of the front frame 2 which is fixedly arranged at a lower end of the right side rod of the front frame 2. A rear end of the right side rod 8 of the front section 11 is hinged to a front end of a right connection base 15. A rear end of the right connection base 15 is hinged to a front end of the right side rod 8 of the rear section 12. A rear end of the right side rod 8 of the rear section 12 is hinged to the lower fixed base 13 of the rear frame 3 which is fixedly arrange at a lower end of the right side rod of the rear frame 3. Thus, the bottom frame 6 is enabled to be foldable in half.

Figure 16:
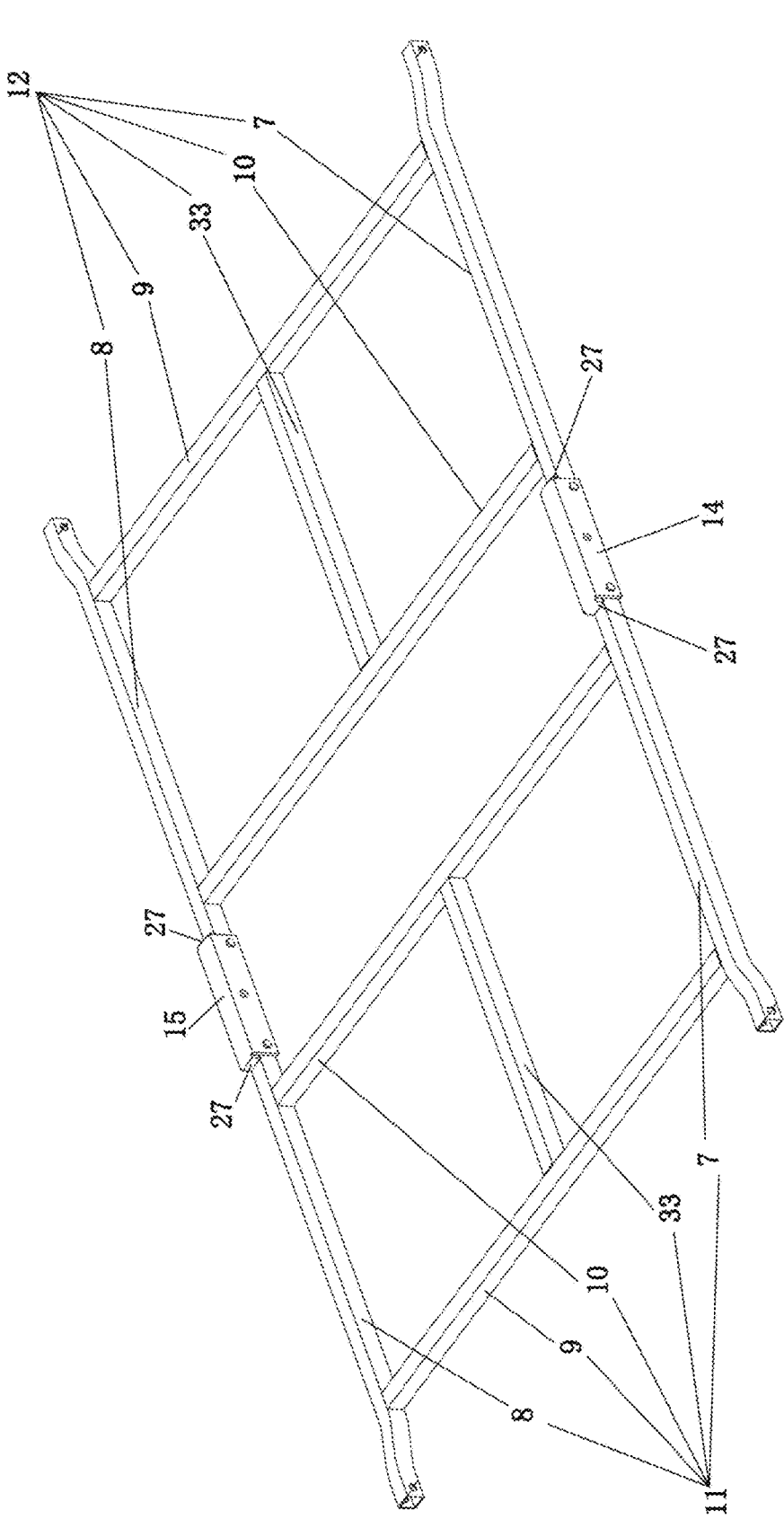
FIG. 16 is a schematic perspective view of a bottom frame in an unfolded state of a fold-in-half wagon according to the present disclosure.
Figure 17:
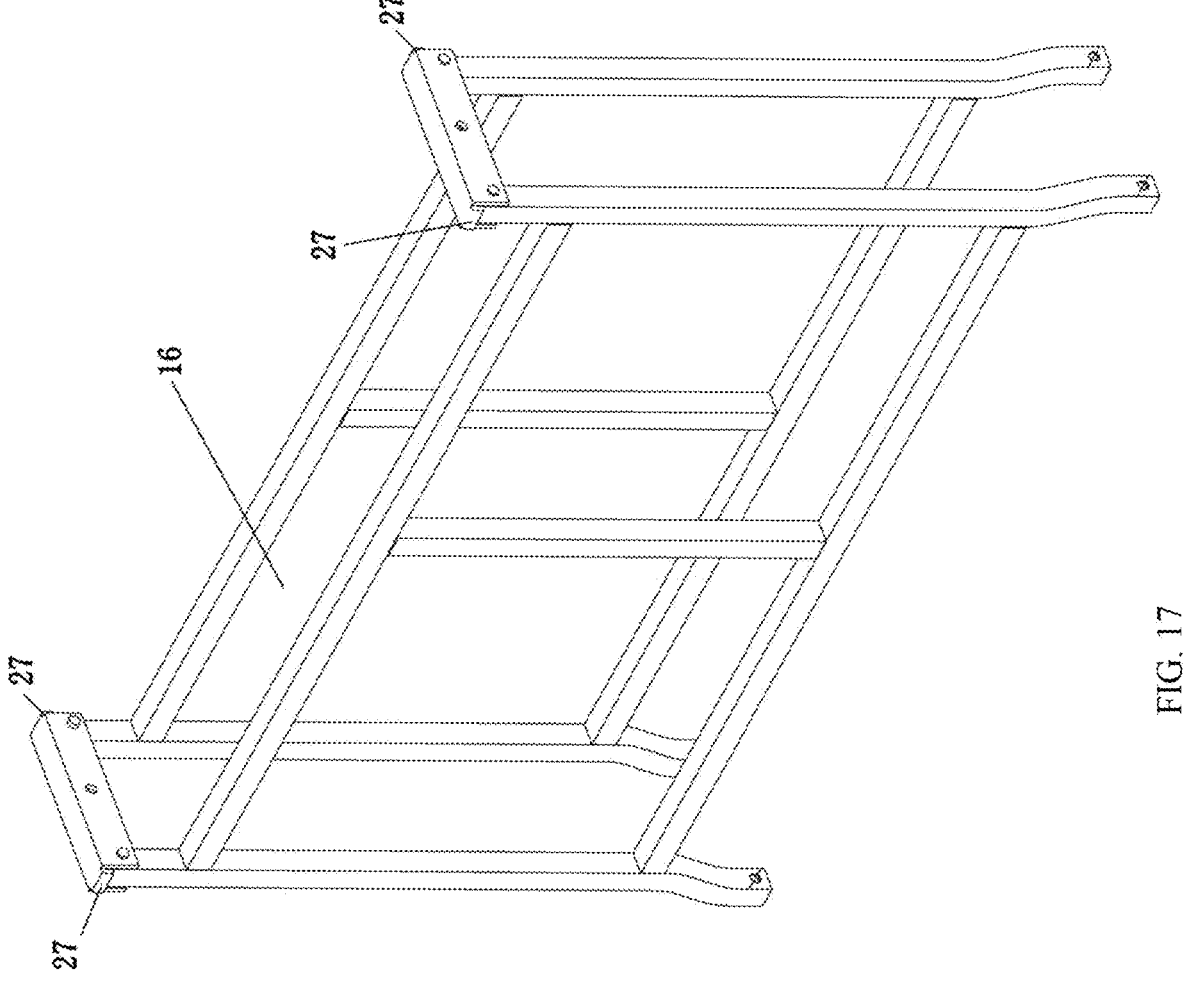
FIG. 17 is a schematic perspective view of a bottom frame in a folded state of a fold-in-half wagon according to the present disclosure.

In this embodiment, to increase the support density, as shown in FIG. 16 and FIG. 17, one or more reinforcing rods 33 are longitudinally or transversely arranged between the outer cross beam 9 and the inner cross beam 10 of the front section 11, and one or more reinforcing rods 33 are longitudinally or transversely arranged between the outer cross beam 9 and the inner cross beam 10 of the rear section 12.

In this embodiment, to improve the universality and reduce the manufacturing costs, as shown in FIG. 16 and FIG. 17, the outer cross beams 9 and the inner cross beams 10 are configured to have the same length, front segments of the left side rod 7 and the right side rod 8 of the front section 11 are expanded outward, and rear segments of the left side rod 7 and the right side rod 8 of the rear section 12 are expanded outward. As such, the bottom frame 6 can better support the bag 31 and objects placed therein.

Figure 12:
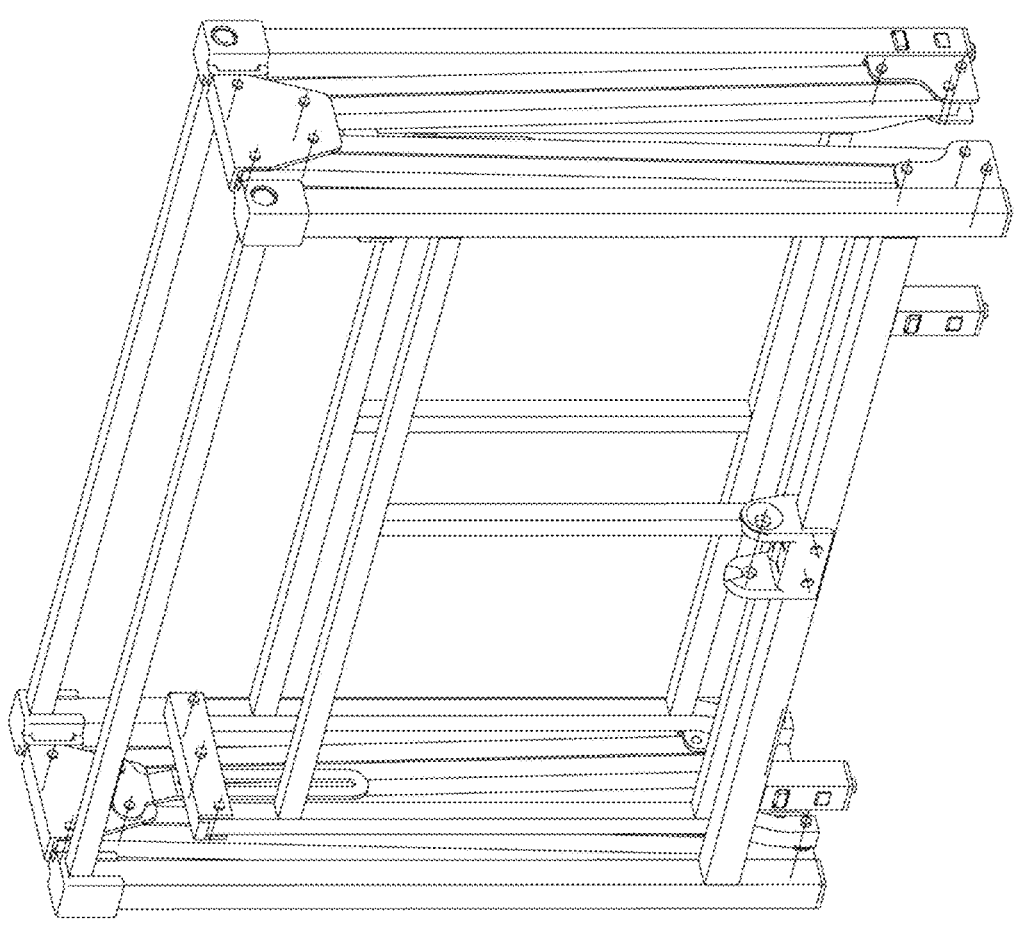
FIG. 12 is a schematic perspective view from a front side of a folding wagon frame in a folded state of a fold-in-half wagon according to the present disclosure.
Figure 14:
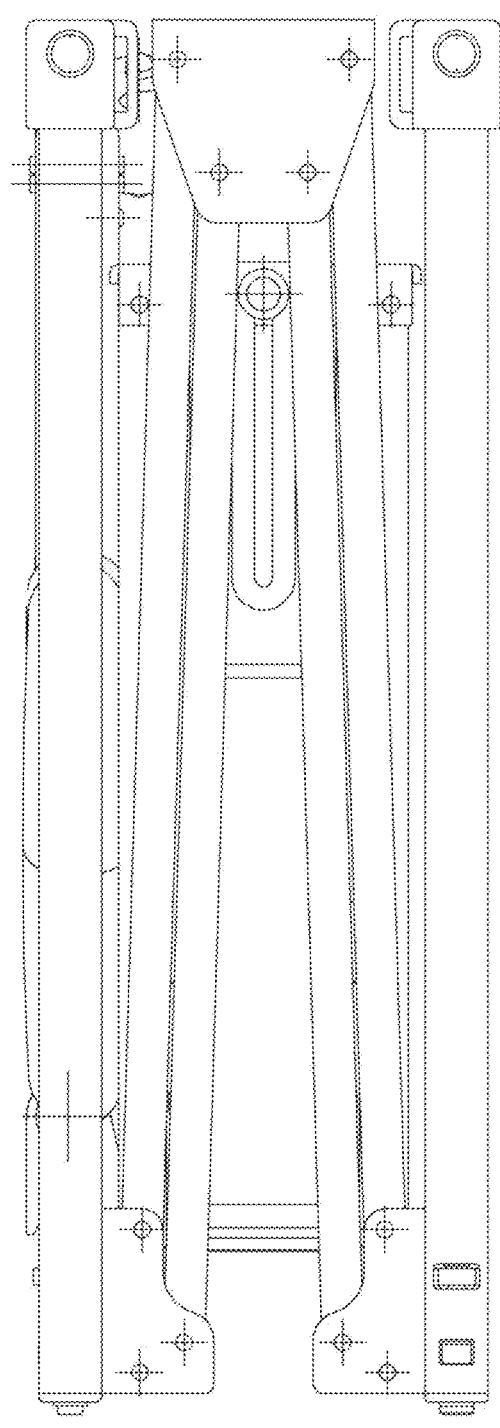
FIG. 14 is a left view of a folding wagon frame in a folded state of a fold-in-half wagon according to the present disclosure.

As shown in FIG. 16 and FIG. 17, the left connection base 14 and the right connection base 15 are configured to have a certain length, and when a force is applied to a middle portion of the bottom frame 6 to lift upward and fold the bottom frame 6, the front section 11, the rear section 12, and the connection bases form a U-shaped accommodating space 16 having an opening facing downward. At the same time, as shown in FIG. 12 and FIG. 14, the front frame 2 and the rear frame 3 synchronously move inward toward each other, and after folded, the front frame 2, the front section 11, the rear section 12 and the rear frame 3 are in a gathered state and are distributed in sequence from front to rear. As can be seen from FIGS. 12 and 14, in the folded state, the volume of the fold-in-half wagon is reduced.

Preferably, as shown in FIG. 1 to FIG. 5, the wheels 1 are respectively detachably connected to lower portions of the front frame 2 and the rear frame 3 and/or lower ends of the four corner columns 37, and when the fold-in-half wagon is to be stored, the wheels 1 are detached and received in the U-shaped accommodating space 16. As such, the wheels 1 can be conveniently stored, and there is no need to provide additional volume to accommodate the wheels 1. This is conducive to reducing the volume, thereby greatly reducing the packaging and transportation costs, making the fold-in-half wagon suitable for long-distance export market.

Definitely, the wheels 1 may also be configured to be non-detachable, i.e., once the installation of the wheels is completed in the factory, the wheels 1 do not need to be detached later. The wheels may be configured to be non-detachable for short-distance domestic sales that is not sensitive to transportation costs or does not have requirements on the volume of the fold-in-half wagon after being folded. In this case, the U-shaped accommodating space 16 may be used for storing other items such as instructions, gifts, and parts that are easily damaged.

For example, in a specific scheme where the wheels 1 are configured to be non-detachable, the wheels 1 are respectively non-detachably connected to lower portions of the front frame 2 and the rear frame 3 and/or lower ends of the four corner columns 37, the wheels 1 are gathered together in a front-rear direction during folding of the fold-in-half wagon, and the wheels 1 are moved away from each other in the front-rear direction during unfolding of the fold-in-half wagon.

Four wheels (1) may be provided, including, for example, two universal wheels on the front side and two directional wheels on the rear side, or two universal wheels on the rear side and two directional wheels on the front side, or two universal wheels on the front side and two universal wheels on the rear side.

In this embodiment, as shown in FIG. 5, a connection column 25 is provided on a lower cross beam 26 of the front frame 2, two wheels 1 are detachably connected to the connection column 25, and a lower end of each of the front side rod and the right side rod of the front frame 2 is detachably connected to one of the wheels 1.

In the present disclosure, as shown in FIG. 1 to FIG. 5, the fold-in-half wagon further includes a handle 35 for a user to move the fold-in-half wagon, and when the front frame 2, the front section 11, the rear section 12, and the rear section 3 are in the gathered state and are distributed in sequence from front to rear, an accommodating recess with the front frame 2 as an opening and the front section 11 as a bottom is formed between the front frame 2 and the front section 11, and/or an accommodating recess with the rear frame 3 as an opening and the rear section 12 as a bottom is formed between the rear frame 3 and the rear section 12, where the accommodating recess is configured to accommodate and store the handle 35. In this case, the thickness of the handle 35 is preferably equal to or less than the depth of the accommodating recess. Definitely, the thickness of the handle 35 may also be appropriately greater than the depth of the accommodating recess.

After the manufacturing is completed, there are two cases regarding the mounting of the bag 31 in the logistics and sales stage. In a first case, the bag 31 is mounted before the fold-in-half wagon leaves the factor. In a second case, the bag 31 is mounted by a user who gets the fold-in-half wagon. In the first case, because the bag 31 can also be folded together with the wagon frame, the state of the wagon frame with the bag 31 as shown in FIG. 1, FIG. 2, FIG. 3, and FIG. 4 can still be formed, where the bag 31 is in a folded state. In the second case, the fold-in-half wagon as shown in FIG. 1, FIG. 2, FIG. 3, and FIG. 4 is placed in a carton as a whole. As shown in FIG. 1, FIG. 2, FIG. 3, and FIG. 4, the folding wagon frame, the wheels 1, and the handle 35 constitute a small cuboid wagon frame in the folded state. The entire cuboid wagon frame is placed in a carton. The bag 31 may be preferably accommodated in the U-shaped accommodating space 16. A user purchasing the fold-in-half wagon may take out the cuboid wagon frame from the carton, unfold the cuboid wagon frame, and mount the bag 31 to the cuboid wagon frame. Such a structure is very compact and convenient.

Figure 8:
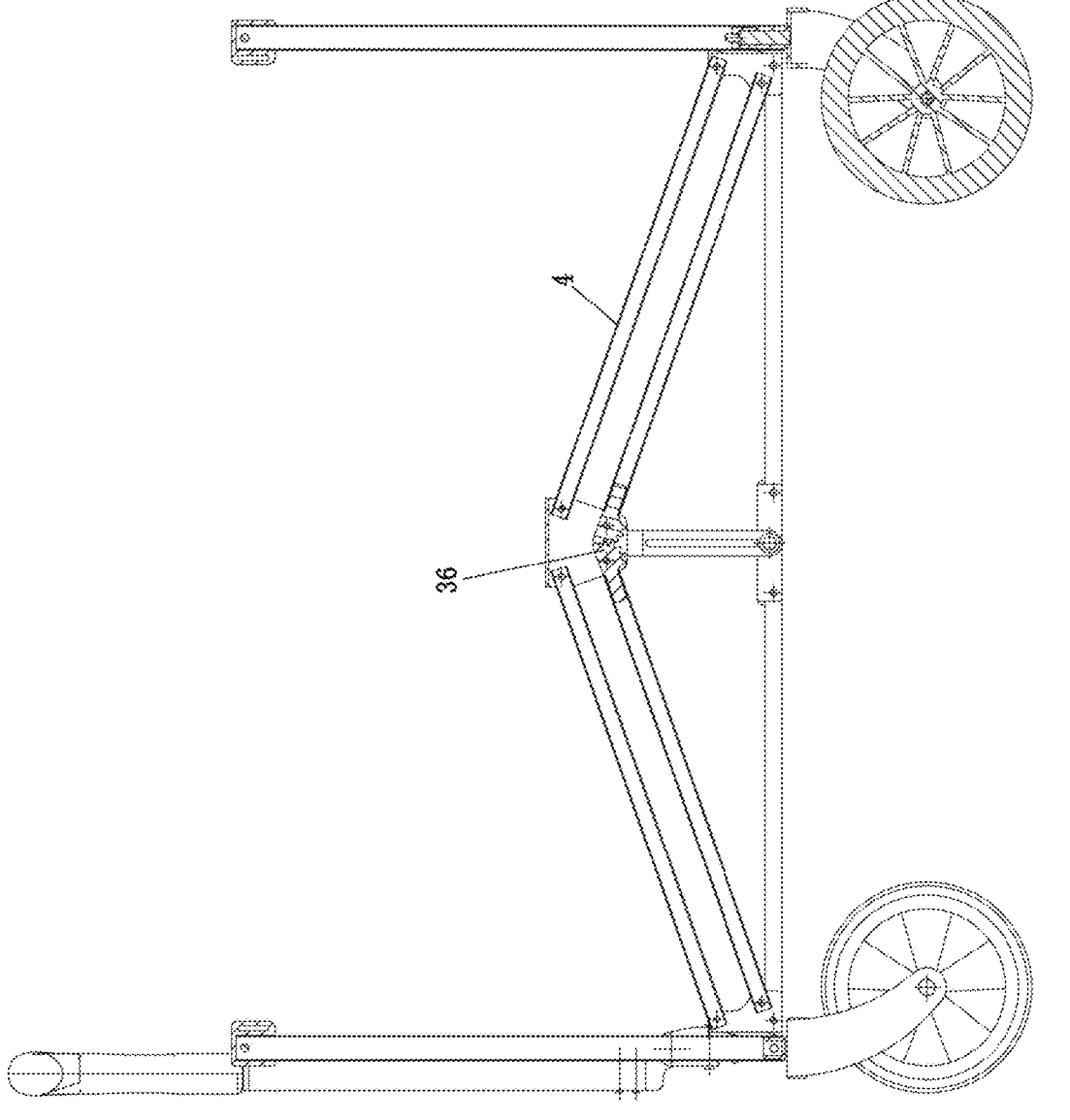
FIG. 8 is a cross-sectional view taken along line A-A.
Figure 13:
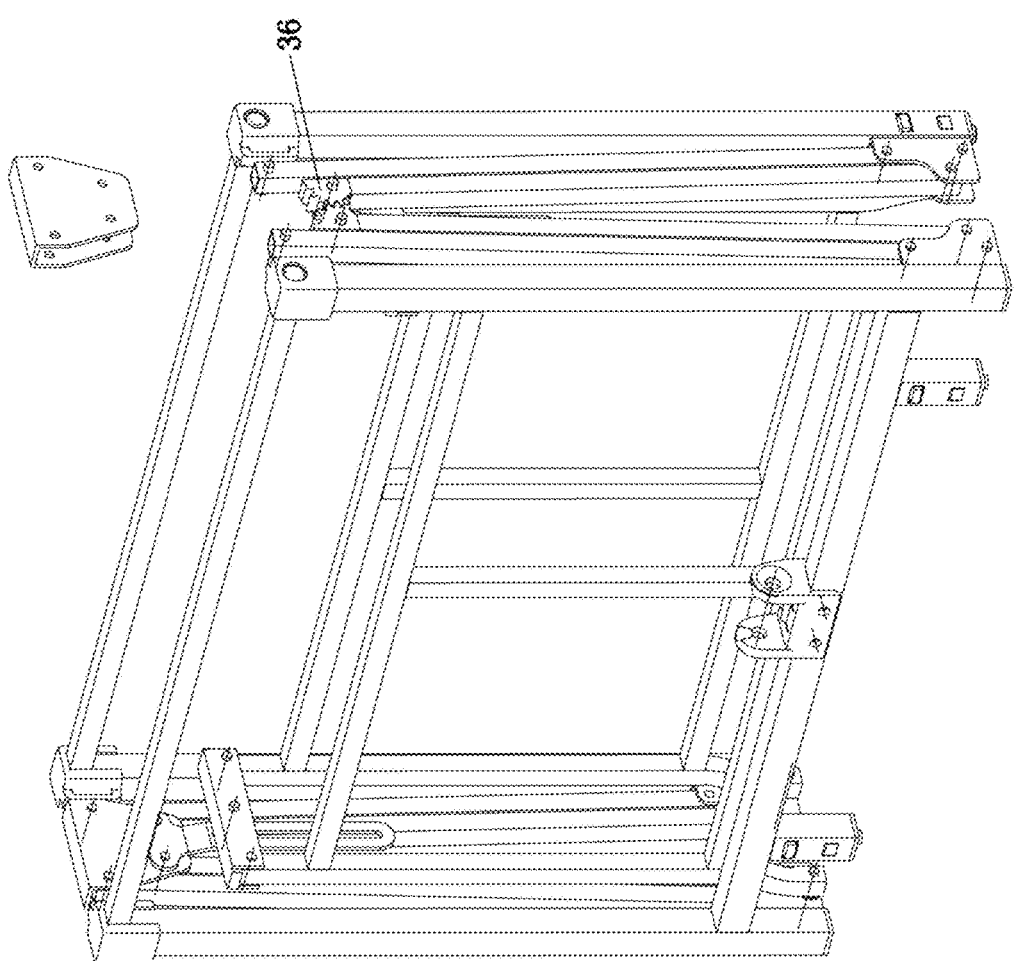
FIG. 13 is a schematic exploded perspective view of a left middle supporting base in FIG. 12.

For the implementation of the U-shaped accommodating space 16, to realize a linkage effect, it is also necessary to consider how to organically integrate the left side frame 4 and the right side frame 5 into the whole design to achieve the design goal of reducing the volume and increasing the capacity as much as possible. Specifically, the left side frame 4 is arranged on a left outer side of the bottom frame 6, the right side frame 5 is arranged on a right outer side of the bottom frame 6, the left side frame 4 and the right side frame 5 each include two parallelograms, and on each side, as shown in FIG. 5, FIG. 8, and FIG. 13, two neighboring inner ends of the two parallelograms are hinged by a middle supporting base, and outer ends of the two parallelograms are respectively hinged to the front frame 2 and the rear frame 3 by the lower fixed bases 13. The middle supporting base at the left side frame 4 is a left middle supporting base 17. The middle supporting base at the right side frame 5 is a right middle supporting base 18. A rigid left suspension component 19 is arranged between the left middle supporting base 17 and a middle portion of the left connection base 14. An upper end of the left suspension component 19 is fixed to the left middle supporting base 17. The left suspension component 19 is provided with a left guide structure 20 along a longitudinal direction thereof. A left fitting structure 21 configured to engage with the left guide structure 20 is arranged at the middle portion of the left connection base 14. The left guide structure 20 is further configured to limit a lower limit position of the left fitting structure 21 to form a first position limitation. A rigid right suspension component 22 is arranged between the right middle supporting base 18 and a middle portion of the right connection base 15. An upper end of the right suspension component 22 is fixed to the right middle supporting base 18. The right suspension component 22 is provided with a right guide structure 23 along a longitudinal direction thereof. A right fitting structure 24 configured to engage with the right guide structure 23 is arranged at the middle portion of the right connection base 15. The right guide structure 23 is further configured to limit a lower limit position of the right fitting structure 24 to form a second position limitation.

Therefore, as shown in FIG. 5, when the left side frame 4 and the right side frame 5 are in an unfolded state, the two parallelograms on each side are distributed in substantially an inverted V-shape, the left fitting structure 21 moves to the lower limit position on the left guide structure 20 to form the first position limitation, and the right fitting structure 24 moves to the lower limit position on the right guide structure 23 to form the second position limitation, so that the front section 11, the connection bases, and the rear section 12 form a flat bottom frame 6, the left suspension component 19 and the right suspension component 22 suspend the bottom frame 6 by the left connection base 14 and the right connection base 15, to finally achieve an unfolded state of the fold-in-half wagon.

To fold the wagon frame for storage, as shown in FIG. 1, FIG. 12, and FIG. 14, the middle portion of the bottom frame 6 is pulled upward, so that the front section 11 and the rear section 12 are folded relative to each other, the left fitting structure 21 moves upward from a lower end along the left guide structure 20, the right fitting structure 24 moves upward from a lower end along the right guide structure 23, and the front section 11 and the rear section 12 drive the front frame 2 and the rear frame 3 to move toward each other and drive the parallelograms of the left side frame 4 and the right side frame 5 to lift the middle supporting bases, so that the front frame 2, the rear frame 3, the left side frame 4, the right side frame 5, the front section 11, and the rear section 12 move toward each other, to finally achieve a folded state of the fold-in-half wagon.

The first position limitation and the second position limitation are not only for the purpose of forming a reliably supported flat bottom frame 6, but also can increase the load capacity of the bottom frame 6.

In the present disclosure, to increase the capacity as much as possible, as shown in FIG. 5, the front frame 2, the rear frame 3, the left side frame 4, and the right side frame 5 each adopt a single rod structure with no overlap in the vertical direction. Compared with the first folding assembly and the second folding assembly of a fold-in-half cart disclosed in Chinese Patent Application No. CN202310206035.X, such a configuration can greatly increase the accommodation space in the vertical direction and the front-rear direction and increase the load capacity.

In some embodiments, to increase the capacity as much as possible, as shown in FIG. 5, the left suspension component 19 is sheet-shaped, the left suspension component 19 is provided with a left guide groove serving as the left guide structure 20 along a longitudinal direction thereof, a left guide column serving as the left fitting structure 21 is arranged at the middle portion of the left connection base 14, the left guide column is slidably engaged with the left guide groove, the right suspension component 22 is also sheet-shaped, the right suspension component 22 is provided with a right guide groove serving as the right guide structure 23 along a longitudinal direction thereof, a right guide column serving as the right fitting structure 24 is arranged at the middle portion of the right connection base 15, and the right guide column is slidably engaged with the right guide groove.

Definitely, other structures may also be used. For example, the left suspension component 19 is rod-shaped, the left suspension component 19 is provided with a left guide groove serving as the left guide structure 20 along a longitudinal direction thereof, a left guide column serving as the left fitting structure 21 is arranged at the middle portion of the left connection base 14, the left guide column is slidably engaged with the left guide groove, the right suspension component 22 is sheet-shaped, the right suspension component 22 is provided with a right guide groove serving as the right guide structure 23 along a longitudinal direction thereof, a right guide column serving as the right fitting structure 24 is arranged at the middle portion of the right connection base 15, and the right guide column is slidably engaged with the right guide groove.

Definitely, other structures may also be used. For example, the left suspension component 19 is rod-shaped, the left suspension component 19 is provided with a left guide rod serving as the left guide structure 20 along a longitudinal direction thereof, a left guide sleeve serving as the left fitting structure 21 is arranged at the middle portion of the left connection base 14, the left guide rod is slidably engaged with the left guide sleeve, the right suspension component 22 is also rod-shaped, the right suspension component 22 is provided with a right guide rod serving as the right guide structure 23 along a longitudinal direction thereof, a right guide sleeve serving as the right fitting structure 24 is arranged at the middle portion of the right connection base 15, and the right guide rod is slidably engaged with the right guide sleeve.

In addition to the above guide structures, other guide structures may also be used. Any guide structure suitable for the present disclosure can be used in the present disclosure, and the details will not be described herein.

In some embodiments, to reduce the volume, as shown in FIG. 1, FIG. 5, and FIG. 12, a connection column 25 is fixedly arranged below, above, or in front of a lower cross beam 26 between two corner columns 37 of the front frame 2, and a lower end of the connection column 25 is arranged to be flush with lower ends of the two corner columns 37.

Definitely, other structures may also be used. For example, a connection column 25 is fixedly arranged above or in front of a lower cross beam 26 between two corner columns 37 of the front frame 2 or is fixedly arranged crossing the lower cross beam 26, and a lower end of the connection column 25 is arranged to be flush with lower ends of the two corner columns 37.

In some embodiments, as shown in FIG. 1, FIG. 5, and FIG. 12, the connection column 25 and the four corner columns 37 are each configured as an outer sleeve having a tubular body with a circular, polygonal, D-shaped, elliptical, or flat oval cross section.

In some embodiments, to further facilitate the folding and unfolding of the fold-in-half wagon and to improve the smoothness and controllability, as shown in FIG. 8 and FIG. 13, the left middle supporting base 17 and the right middle supporting base 18 are each provided with a transmission structure, the transmission structure is respectively connected to any pair of neighboring ends of the corresponding two parallelograms, and when one of the parallelograms moves, the other parallelogram is synchronously driven to move by the transmission structure. When one of the parallelograms moves outward, the other parallelogram moves outward, so that the two parallelograms move away from each other to achieve the unfolded state. When one of the parallelograms moves inward, the other parallelogram moves inward, so that the two parallelograms move toward each other to achieve the folded state.

In this embodiment, as shown in FIG. 8 and FIG. 13, the transmission structure includes a transmission gear 36, and linkage and synchronization is achieved by the transmission gear 36.

Definitely, other structures may also be used. For example, link gearing may be used. Any guide linkage structure suitable for the present disclosure can be used in the present disclosure, e.g., the guide and linkage structure described in Chinese Patent Application No. ZL 202320507408.2 entitled "Folding Wagon Frame And Folding Wagon" falls within the scope of protection of the present disclosure, and the details will not be described herein.

In some embodiments, to provide support and positioning to enable the unfolded bottom frame 6 to have a better flat state, as shown in FIG. 5, FIG. 16, and FIG. 17, the left connection base 14 and the right connection base 15 are each in a form of a channel-section member with an inverted U-shaped cross section and an opening facing downward, a limiting portion 27 is arranged at each of two ends of the channel-section member, and when the bottom frame 6 is unfolded, the limiting portions 27 form a downward position limitation to upper side surfaces of the left side rod and the right side rod of the front section 11 and the left side rod and the right side rod of the rear section 12.

Figure 18:
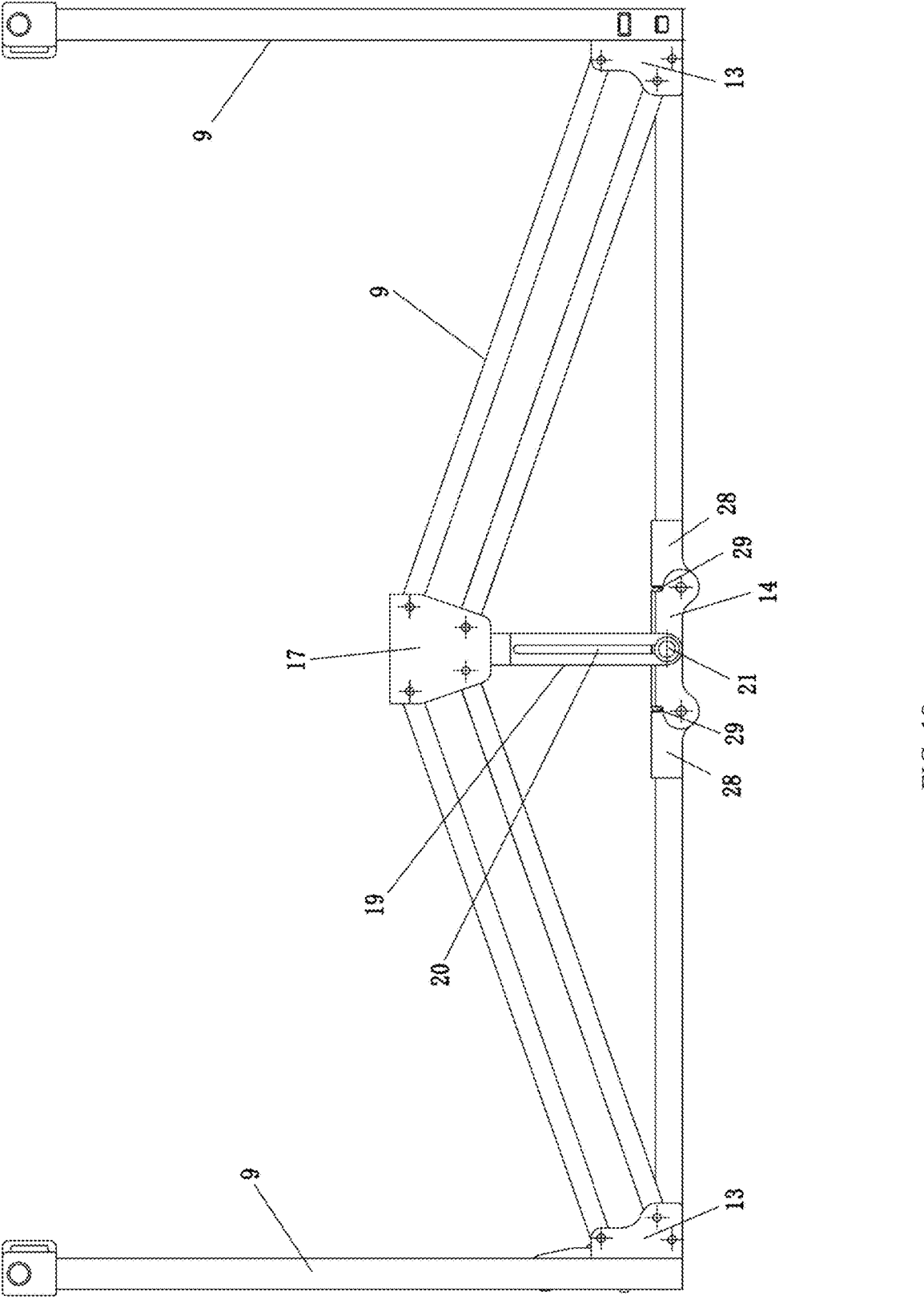
FIG. 18 is a left view of a folding wagon frame of a fold-in-half wagon using connection members according to the present disclosure.
Figure 19:
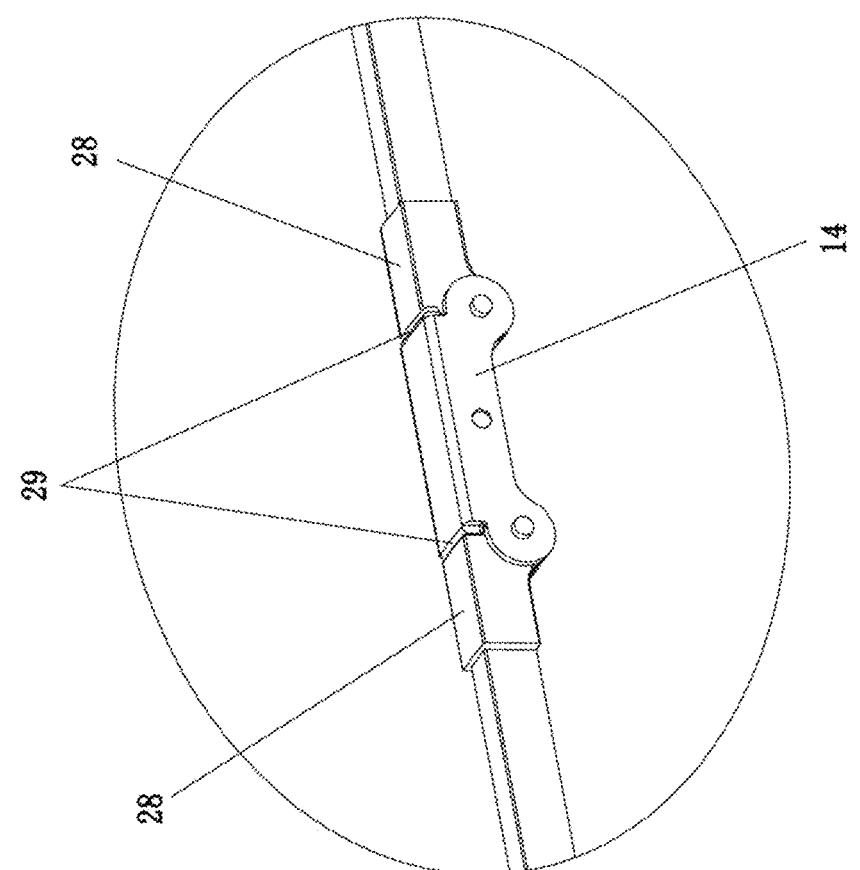
FIG. 19 is a schematic enlarged perspective view of part A.

Definitely, other structures may also be used. For example, as shown in FIG. 18 and FIG. 19, the left connection base 14 and the right connection base 15 are each in a form of a channel-section member with an inverted U-shaped cross section and an opening facing downward, a connection member 28 is hinged to each of two ends of the channel-section member, the connection members 28 are fixedly connected to corresponding side rods in one-to-one correspondence by, for example, riveting, screwing, or welding, each of the connection members 28 is provided with a limiting end 29 above a hinge axis, and when the bottom frame 6 is in the unfolded state, two ends of the connection bases limit the left side rod and the right side rod of the front section 11 and the left side rod and the right side rod of the rear section 12 in a horizontal direction by the limiting ends 29 of the connection members 28. As such, a better supporting and positioning effect is provided, which is conducive to increasing the supporting strength of the bottom frame 6.

Figure 15:
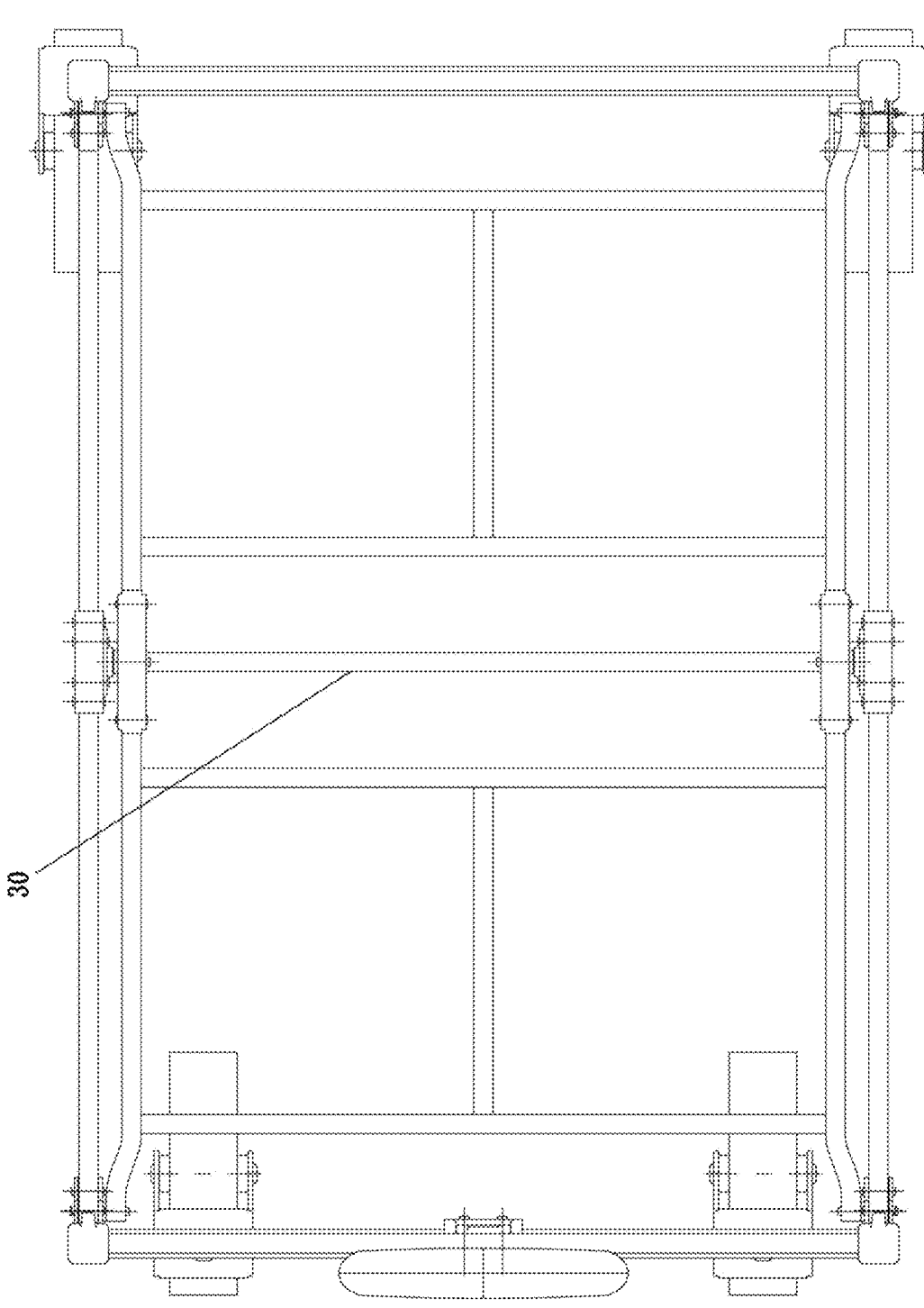
FIG. 15 is a top view of a fold-in-half wagon in an unfolded state according to the present disclosure, where a connecting rod is provided on a bottom frame.

In some embodiments, to improve the support and smooth movement of the left connection base 14 and the right connection base 15 in the folded state, as shown in FIG. 15, a connecting rod 30 is arranged between the middle portion of the left connection base 14 and the middle portion of the right connection base 15, the left connection base 14 and the right connection base 15 are transversely connected together by the connecting rod 30, and when the connecting rod 30 is pulled upward, the connecting rod 30 drives the left connection base 14 and the right connection base 15 to move upward, so that the front section 11 and the rear section 12 are folded relative to each other.

Figure 10:
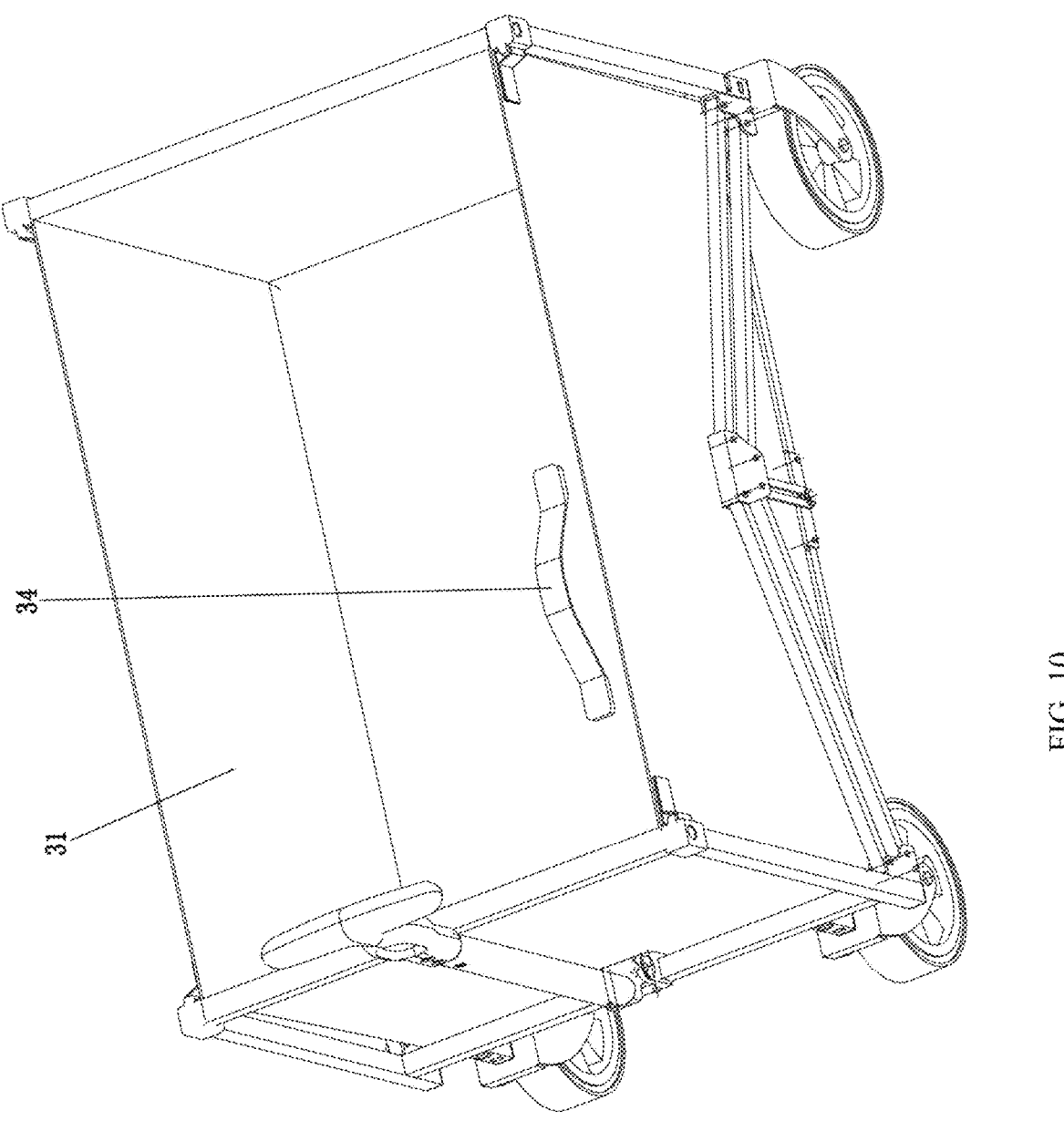
FIG. 10 is a schematic perspective view from a top side of a fold-in-half wagon in an unfolded state with a bag mounted thereto according to the present disclosure.

Definitely, other structures may also be used. For example, as shown in FIG. 10 and FIG. 11, the left connection base 14 and the right connection base 15 are transversely connected together by the bag 31 of the fold-in-half wagon, a pull strap 34 is arranged on the bag 31, and when the pull strap 34 is pulled upward, the bag 31 drives the left connection base 14 and the right connection base 15 to move upward, so that the front section 11 and the rear section 12 are folded relative to each other.

Further, the inner cross beam 10 on an inner side of the front section 11 and the inner cross beam 10 on an inner side of the rear section 12 are bundled together by a Velcro tie 32 on a bottom surface of a bag 31 of the fold-in-half wagon, or a connecting rod 30 is fixedly arranged between the left connection base 14 and the right connection base 15 in the transverse direction, and a Velcro tie 32 is connected to the connecting rod 30. A pull strap 34 is arranged at a middle portion of an inner bottom surface of the bag 31. When the pull strap 34 is pulled upward, the bag 31 drives the left connection base 14 and the right connection base 15 to move upward, so that the front section 11 and the rear section 12 are folded relative to each other. As such, the fold-in-half wagon the assembly can be convenient assembled and can be manufactured at low costs.

Figure 9:
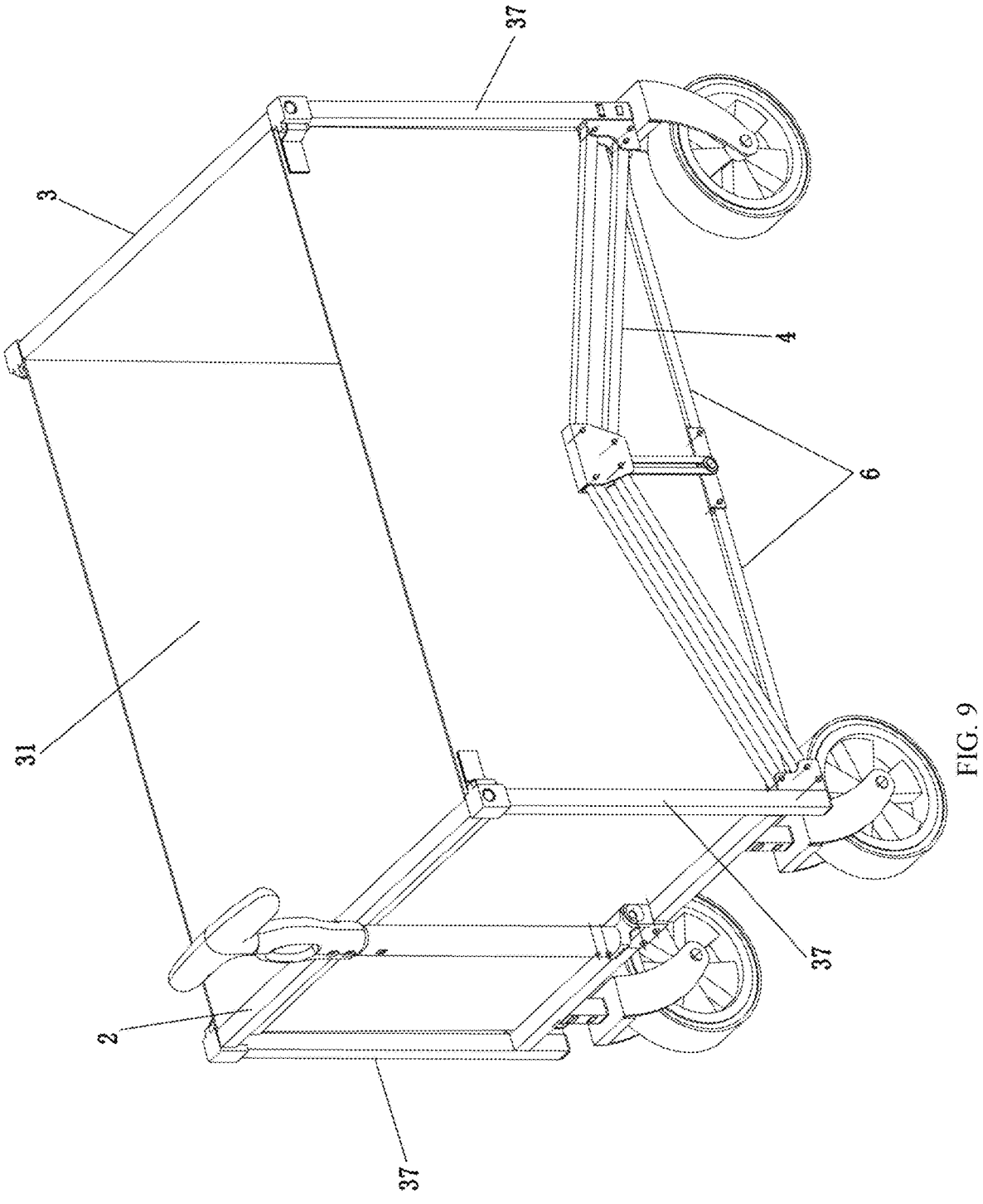
FIG. 9 is a schematic perspective view from a left side of a fold-in-half wagon in an unfolded state with a bag mounted thereto according to the present disclosure.

It can be seen from the above that the technical scheme of the present disclosure provides a fold-in-half wagon that has a small volume when folded and has a capacity as large as possible when unfolded. Based on the examples, during manufacturing of a specific product, the length of each component can be determined by size matching optimization. As such, after the fold-in-half wagon is folded, a regular coboid wagon frame as shown in FIG. 1, FIG. 2, FIG. 3, and FIG. 4 can be obtained, and after the fold-in-half wagon is unfolded, the unfolded state as shown in FIG. 5 can be obtained, or the unfolded state in the case where the bag 31 is mounted as shown in FIG. 9, FIG. 10, and FIG. 11 can be obtained. The bag 31 is located in a coboid accommodation frame formed by the front frame 2, the rear frame 3, the left side frame 4, the right side frame 5, and the bottom frame 6.

To help understand the present disclosure, if necessary, reference can be made to other embodiments or drawings for the above structures, and the details will not be repeated herein.

The above descriptions are merely optional embodiments of the present disclosure, and any equivalent variation or modification made according to the structures, features, and principles without departing from the scope of the present disclosure shall fall within the scope of the appended claims.

What is claimed is:

1. A fold-in-half wagon, comprising wheels and a foldable wagon frame, wherein the wheels are detachably or non-detachably connected to the wagon frame, and the wagon frame comprises a bottom frame, a front frame arranged on a front side of the bottom frame, a rear frame arranged on a rear side of the bottom frame, and a left side frame and a right side frame respectively arranged on two lateral sides of the bottom frame, wherein a left side rod and a right side rod of the front frame and a left side rod and a right side rod of the rear frame respectively serve as four corner columns at four corners of the wagon frame;

the bottom frame comprises a front section, a rear section, and a left connection base and a right connection base symmetrically arranged in a left-right direction, a front end of the left side rod of the front section is hinged to a lower fixed base of the front frame which is fixedly arranged at a lower end of the left side rod of the front frame, a rear end of the left side rod of the front section is hinged to a front end of the left connection base, a rear end of the left connection base is hinged to a front end of the left side rod of the rear section, a rear end of the left side rod of the rear section is hinged to a lower fixed base of the rear frame which is fixedly arrange at a lower end of the left side rod of the rear frame, a front end of the right side rod of the front section is hinged to the lower fixed base of the front frame which is fixedly arranged at a lower end of the right side rod of the front frame, a rear end of the right side rod of the front section is hinged to a front end of the right connection base, a rear end of the right connection base is hinged to a front end of the right side rod of the rear section, and a rear end of the right side rod of the rear section is hinged to the lower fixed base of the rear frame which is fixedly arrange at a lower end of the right side rod of the rear frame, to enable the bottom frame to be foldable in half; when a force is applied to a middle portion of the bottom frame to lift upward and fold the bottom frame, the front section, the rear section, and the connection bases form a U-shaped accommodating space having an opening facing downward; and the front frame and the rear frame synchronously move inward toward each other, and after folded, the front frame, the front section, the rear section and the rear frame are in a gathered state and are distributed in sequence from front to rear;

the left side frame is arranged on a left outer side of the bottom frame, the right side frame is arranged on a right outer side of the bottom frame, the left side frame and the right side frame each comprise two parallelograms, and on each side, two neighboring inner ends of the two parallelograms are hinged by a middle supporting base, and outer ends of the two parallelograms are respectively hinged to the front frame and the rear frame by the lower fixed bases, wherein the middle supporting base at the left side frame is a left middle supporting base, the middle supporting base at the right side frame is a right middle supporting base, a left suspension component is arranged between the left middle supporting base and a middle portion of the left connection base, an upper end of the left suspension component is fixed to the left middle supporting base, the left suspension component is provided with a left guide structure along a longitudinal direction thereof, a left fitting structure configured to engage with the left guide structure is arranged at the middle portion of the left connection base, the left guide structure is further configured to limit a lower limit position of the left fitting structure to form a first position limitation, a rigid right suspension component is arranged between the right middle supporting base and a middle portion of the right connection base, an upper end of the right suspension component is fixed to the right middle supporting base, the right suspension component is provided with a right guide structure along a longitudinal direction thereof, a right fitting structure configured to engage with the right guide structure is arranged at the middle portion of the right connection base, and the right guide structure is further configured to limit a lower limit position of the right fitting structure to form a second position limitation;

when the left side frame and the right side frame are in an unfolded state, the two parallelograms on each side are distributed in substantially an inverted V-shape, the left fitting structure moves to the lower limit position on the left guide structure to form the first position limitation, and the right fitting structure moves to the lower limit position on the right guide structure to form the second position limitation, so that the front section, the connection bases, and the rear section form a flat bottom frame, the left suspension component and the right suspension component suspend the bottom frame by the left connection base and the right connection base, to finally achieve an unfolded state of the fold-in-half wagon; and to fold the wagon frame for storage, the middle portion of the bottom frame is pulled upward, so that the front section and the rear section are folded relative to each other, the left fitting structure moves upward along the left guide structure, the right fitting structure moves upward from a lower end along the right guide structure, and the front section and the rear section drive the front frame and the rear frame to move toward each other and drive the parallelograms of the left side frame and the right side frame to lift the middle supporting bases, so that the front frame, the rear frame, the left side frame, the right side frame, the front section, and the rear section move toward each other, to finally achieve a folded state of the fold-in-half wagon.

2. The fold-in-half wagon of claim 1, wherein the left suspension component is sheet-shaped or rod-shaped, the left suspension component is provided with a left guide groove or a left guide rod along a longitudinal direction thereof, a left guide column or a left guide sleeve is arranged at the middle portion of the left connection base, the left guide column or the left guide sleeve is slidably engaged with the left guide groove or the left guide rod, the right suspension component is sheet-shaped or rod-shaped, the right suspension component is provided with a right guide groove or a right guide rod along a longitudinal direction thereof, a right guide column or a right guide sleeve is arranged at the middle portion of the right connection base, and the right guide column or the right guide sleeve is slidably engaged with the right guide groove or the right guide rod.

3. The fold-in-half wagon of claim 1, wherein the wheels are respectively detachably connected to lower portions of the front frame and the rear frame and/or lower ends of the four corner columns, and when the fold-in-half wagon is to be stored, the wheels are detached and received in the U-shaped accommodating space.

4. The fold-in-half wagon of claim 3, wherein a connection column is provided on a lower cross beam of the front frame, wheels are detachably connected to the connection column, and a lower end of each of the front side rod and the right side rod of the front frame is detachably connected to one of the wheels; or a connection column is provided on a lower cross beam of the rear frame, wheels are detachably connected to the connection column, and a lower end of each of the front side rod and the right side rod of the rear frame is detachably connected to one of the wheels; or each of a lower cross beam of the front frame and a lower cross beam of the rear frame is provided with a connection column, and the wheels are detachably connected to the connection columns; or a lower end of each of the four corner columns is detachably connected to one of the wheels.

5. The fold-in-half wagon of claim 4, wherein a connection column is fixedly arranged below, above, or in front of a lower cross beam between two corner columns, or is fixedly arranged crossing the lower cross beam, and wherein a lower end of the connection column is arranged to be flush with or lower than lower ends of the two corner columns.

6. The fold-in-half wagon of claim 4, wherein the connection column and the four corner columns are each configured as an outer sleeve having a tubular body with a circular, polygonal, D-shaped, elliptical, or flat oval cross section.

7. The fold-in-half wagon of claim 1, wherein the left middle supporting base and the right middle supporting base are each provided with a transmission structure, the transmission structure is respectively connected to any pair of neighboring ends of the corresponding two parallelograms, and when one of the parallelograms moves, the other parallelogram is synchronously driven to move by the transmission structure, wherein when one of the parallelograms moves outward, the other parallelogram moves outward, so that the two parallelograms move away from each other to achieve the unfolded state; and when one of the parallelograms moves inward, the other parallelogram moves inward, so that the two parallelograms move toward each other to achieve the folded state.

8. The fold-in-half wagon of claim 1, wherein the left connection base and the right connection base are each in a form of a channel-section member with an inverted U-shaped cross section and an opening facing downward, a limiting portion is arranged at each of two ends of the channel-section member, and when the bottom frame is unfolded, the limiting portions form a downward position limitation to upper side surfaces of the left side rod and the right side rod of the front section and the left side rod and the right side rod of the rear section; or the left connection base and the right connection base are each in a form of a channel-section member with an inverted U-shaped cross section and an opening facing downward, a connection member is hinged to each of two ends of the channel-section member, the connection members are fixedly connected to corresponding side rods in one-to-one correspondence, each of the connection members is provided with a limiting end above a hinge axis, and when the bottom frame is in the unfolded state, two ends of the connection bases limit the left side rod and the right side rod of the front section and the left side rod and the right side rod of the rear section in a horizontal direction by the limiting ends of the connection members.

9. The fold-in-half wagon of claim 1, wherein a connecting rod is arranged between the middle portion of the left connection base and the middle portion of the right connection base, the left connection base and the right connection base are transversely connected together by the connecting rod, and when the connecting rod is pulled upward, the connecting rod drives the left connection base and the right connection base to move upward, so that the front section and the rear section are folded relative to each other.

10. The fold-in-half wagon of claim 1, wherein an outer cross beam and an inner cross beam are arranged between a left side rod and a right side rod of the front section in a transverse direction, and an another outer cross beam and an another inner cross beam are arranged between a left side rod and a right side rod of the rear section in the transverse direction.

11. The fold-in-half wagon of claim 10, wherein the inner cross beam on an inner side of the front section and the inner cross beam on an inner side of the rear section are bundled together by a Velcro tie on a bottom surface of a bag of the fold-in-half wagon, or a connecting rod is fixedly arranged between the left connection base and the right connection base in the transverse direction, and a Velcro tie is connected to the connecting rod; and a pull strap is arranged at a middle portion of an inner bottom surface of the bag, and when the pull strap is pulled upward, the bag drives the left connection base and the right connection base to move upward, so that the front section and the rear section are folded relative to each other.

12. The fold-in-half wagon of claim 1, further comprising a handle for a user to move the fold-in-half wagon, wherein when the front frame, the front section, the rear section, and the rear section are in the gathered state and are distributed in sequence from front to rear, an accommodating recess with the front frame as an opening and the front section as a bottom is formed between the front frame and the front section, and/or an accommodating recess with the rear frame as an opening and the rear section as a bottom is formed between the rear frame and the rear section, wherein the accommodating recess is configured to accommodate and store the handle.

13. The fold-in-half wagon of claim 1, wherein the wheels are respectively non-detachably connected to lower portions of the front frame and the rear frame and/or lower ends of the four corner columns, the wheels are gathered together in a front-rear direction during folding of the fold-in-half wagon, and the wheels are moved away from each other in the front-rear direction during unfolding of the fold-in-half wagon.

14. The fold-in-half wagon of claim 13, wherein four wheels are provided, comprising two universal wheels on the front side and two directional wheels on the rear side, or two universal wheels on the rear side and two directional wheels on the front side, or two universal wheels on the front side and two universal wheels on the rear side.

15. The fold-in-half wagon of claim 1, wherein the front frame and the rear frame are rectangular.

*    *    *    *    *